(12) United States Patent
Kusano et al.

(10) Patent No.: US 11,641,530 B2
(45) Date of Patent: May 2, 2023

(54) PHOTOELECTRIC CONVERSION DEVICE, IMAGING SYSTEM, AND MOVING BODY WITH PIXEL SIGNAL CORRECTION

(71) Applicant: CANON KABUSHIKI KAISHA, Tokyo (JP)

(72) Inventors: Hotaka Kusano, Kanagawa (JP); Kazuo Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/218,330

(22) Filed: Mar. 31, 2021

(65) Prior Publication Data
US 2021/0314508 A1 Oct. 7, 2021

(30) Foreign Application Priority Data

Apr. 1, 2020 (JP) .............................. JP2020-066197
Jan. 8, 2021 (JP) .............................. JP2021-002274

(51) Int. Cl.
*H04N 5/365* (2011.01)
*H04N 5/3745* (2011.01)
*H04N 5/378* (2011.01)

(52) U.S. Cl.
CPC ........... *H04N 5/3658* (2013.01); *H04N 5/378* (2013.01); *H04N 5/37455* (2013.01)

(58) Field of Classification Search
CPC .. H04N 5/3658; H04N 5/37455; H04N 5/378; H04N 5/361; H04N 5/36963; H04N 5/374
See application file for complete search history.

(56) References Cited

U.S. PATENT DOCUMENTS

| 7,423,790 | B2 | 9/2008 | Kochi et al. |
| 7,816,755 | B2 | 10/2010 | Yamazaki et al. |
| 8,049,799 | B2 | 11/2011 | Sonoda et al. |
| 8,325,260 | B2 | 12/2012 | Yamazaki et al. |
| 8,760,337 | B2 | 6/2014 | Yamazaki |
| 8,836,313 | B2 | 9/2014 | Takagi et al. |
| 9,060,139 | B2 | 6/2015 | Yamazaki |
| 9,288,415 | B2 | 3/2016 | Yamazaki et al. |
| 9,407,847 | B2 | 8/2016 | Maehashi et al. |

(Continued)

FOREIGN PATENT DOCUMENTS

| JP | 2009-171128 A | 7/2009 |
| JP | 2010-272985 A | 12/2010 |

(Continued)

*Primary Examiner* — Nicholas G Giles
(74) *Attorney, Agent, or Firm* — Venable LLP

(57) ABSTRACT

A photoelectric conversion device comprising: a plurality of effective pixels and a plurality of light shielded pixels which are arranged respectively in a plurality of rows and a plurality of columns; and a signal processing circuit, wherein in a period during which pixel signals are output from first light shielded pixels which are first-row light shielded pixels to a first vertical output line, pixel signals are output from second light shielded pixels which are second-row light shielded pixels to a second vertical output line, and the signal processing circuit corrects effective pixel signals output from the effective pixels by using a correction signal obtained by performing filtering processing on pixel signals from the first light shielded pixels and on the pixel signals from the second light shielded pixels.

15 Claims, 13 Drawing Sheets

(56) References Cited

U.S. PATENT DOCUMENTS

| | | |
|---|---|---|
| 9,509,931 B2 | 11/2016 | Kobayashi et al. |
| 9,667,901 B2 | 5/2017 | Sakai et al. |
| 9,681,076 B2 | 6/2017 | Oguro et al. |
| 9,762,840 B2 | 9/2017 | Yamazaki et al. |
| 10,403,658 B2 | 9/2019 | Takada et al. |
| 10,834,354 B2 | 11/2020 | Kobayashi et al. |
| 10,992,886 B2 | 4/2021 | Yamazaki et al. |
| 2010/0295978 A1 | 11/2010 | Nakamura et al. |
| 2014/0029065 A1 | 1/2014 | Nakazawa |
| 2014/0307142 A1* | 10/2014 | Matsumoto .......... H04N 5/3745 348/308 |
| 2020/0186738 A1 | 6/2020 | Takada et al. |
| 2020/0314360 A1 | 10/2020 | Sakai et al. |
| 2021/0021770 A1 | 1/2021 | Nakazawa et al. |
| 2021/0021782 A1 | 1/2021 | Sato et al. |

FOREIGN PATENT DOCUMENTS

| | | |
|---|---|---|
| JP | 2013-106186 A | 5/2013 |
| JP | 2014-027434 A | 2/2014 |

* cited by examiner

$CLMP3[1] = CLMP3[0] + \{AVE\_R[1] - CLMP\_CH1(1) - CLMP3[0]\}/2^n$
$CLMP3[2] = CLMP3[1] + \{AVE\_R[2] - CLMP\_CH3(1) - CLMP3[1]\}/2^n$
$CLMP4[1] = CLMP4[0] + \{AVE\_Gr[1] - CLMP\_CH5(1) - CLMP4[0]\}/2^n$
$CLMP4[2] = CLMP4[1] + \{AVE\_Gr[2] - CLMP\_CH7(1) - CLMP4[1]\}/2^n$ $CLMP3[3] = CLMP3[2] + \{AVE\_R[3] - CLMP\_CH1(2) - CLMP3[2]\}/2^n$
$CLMP3[4] = CLMP3[3] + \{AVE\_R[4] - CLMP\_CH3(2) - CLMP3[3]\}/2^n$
$CLMP4[3] = CLMP4[2] + \{AVE\_Gr[3] - CLMP\_CH5(2) - CLMP4[2]\}/2^n$
$CLMP4[4] = CLMP4[3] + \{AVE\_Gr[4] - CLMP\_CH7(2) - CLMP4[3]\}/2^n$

FIG. 6B 300-1

DATA_R[1] = AVE_R[1] − CLMP3[0]
DATA_R[3] = AVE_R[3] − CLMP3[2]

300-3

DATA_R[2] = AVE_R[2] − CLMP3[1]
DATA_R[4] = AVE_R[4] − CLMP3[3]

300-5

DATA_Gr[1] = AVE_Gr[1] − CLMP4[0]
DATA_Gr[3] = AVE_Gr[3] − CLMP4[2]

300-7

DATA_Gr[2] = AVE_Gr[2] − CLMP4[1]
DATA_Gr[4] = AVE_Gr[4] − CLMP4[3]

200-9

$CLMP\_CH1(1) = CLMP\_CH1(0) + \{DATA\_R[1] - CLMP\_CH1(0)\}/2^n$
$CLMP\_CH1(2) = CLMP\_CH1(1) + \{DATA\_R[3] - CLMP\_CH1(1)\}/2^n$ 200-11

$CLMP\_CH3(1) = CLMP\_CH3(0) + \{DATA\_R[2] - CLMP\_CH3(0)\}/2^n$
$CLMP\_CH3(2) = CLMP\_CH3(1) + \{DATA\_R[4] - CLMP\_CH3(1)\}/2^n$ 200-13

$CLMP\_CH5(1) = CLMP\_CH5(0) + \{DATA\_R[1] - CLMP\_CH5(0)\}/2^n$
$CLMP\_CH5(2) = CLMP\_CH5(1) + \{DATA\_R[3] - CLMP\_CH5(1)\}/2^n$ 200-15

$CLMP\_CH7(1) = CLMP\_CH7(0) + \{DATA\_R[2] - CLMP\_CH7(0)\}/2^n$
$CLMP\_CH7(2) = CLMP\_CH7(1) + \{DATA\_R[4] - CLMP\_CH7(1)\}/2^n$ 105-5

$CLMP3[1] = CLMP3[0] + \{DATA\_R[1] + CLMP\_CH1(1) - CLMP3[0]\}/2^n$
$CLMP3[2] = CLMP3[1] + \{DATA\_R[2] - CLMP\_CH3[1] - CLMP3[1]\}/2^n$
$CLMP4[1] = CLMP4[0] + \{DATA\_Gr[1] - CLMP\_CH5[1] - CLMP4[0]\}/2^n$
$CLMP4[2] = CLMP4[1] + \{DATA\_Gr[2] - CLMP\_CH7[1] - CLMP4[1]\}/2^n$ $CLMP3[3] = CLMP3[2] + \{DATA\_R[3] - CLMP\_CH1[2] - CLMP3[2]\}/2^n$
$CLMP3[4] = CLMP3[3] + \{DATA\_R[4] - CLMP\_CH3[2] - CLMP3[3]\}/2^n$
$CLMP4[3] = CLMP4[2] + \{DATA\_Gr[3] - CLMP\_CH5[2] - CLMP4[2]\}/2^n$
$CLMP4[4] = CLMP4[3] + \{DATA\_Gr[4] - CLMP\_CH7[2] - CLMP4[3]\}/2^n$

PHOTOELECTRIC CONVERSION DEVICE, IMAGING SYSTEM, AND MOVING BODY WITH PIXEL SIGNAL CORRECTION

BACKGROUND OF THE INVENTION

Field of the Invention

The present invention relates to a photoelectric conversion device, an imaging system, and a moving body.

Description of the Related Art

In recent years, a photoelectric conversion device to be mounted in a digital still camera, a video camera, a mobile phone, or the like has been developed.

As examples of the photoelectric conversion device, a charge coupled device (CCD) sensor and a complementary metal oxide semiconductor (CMOS) sensor have been widely known. The CMOS sensor has advantages over the CCD sensor, such as low power consumption, high-speed reading, a capability of being implemented as a system on chip, and therefore attracts increasing attention.

The CMOS sensor includes, for each of pixels, an amplification circuit including a floating diffusion amplifier or the like. When a pixel signal is to be read, in many cases a method is used, which selects a given row in a pixel array portion in which pixels are arranged in a row direction and a column direction in the form of a matrix, and which simultaneously reads pixel signals from all the pixels located in the selected one row.

As a result, in the CMOS sensor, a configuration-related problem occurs in that offset noise (hereinafter referred to as horizontal stripe noise) uniformly occurs in a horizontal one line. To prevent the problem, a conventional imaging device corrects the horizontal stripe noise by using optical black (hereinafter referred to as OB) signals from light shielded pixels in an image sensor.

Japanese Patent Application Publication No. 2013-106186 describes a clamp circuit which clamps (corrects) pixel signals from effective pixels by using an average value of pixel signals in a plurality of horizontal lines in an OB region, and a clamp circuit which clamps the pixel signals from the effective pixels by arithmetically determining an average value of the pixel signals in each of the horizontal lines. This application publication also describes a detection block which detects horizontal stripe noise by using the OB region. In this application publication, switching is performed between the two types of clamp circuits in accordance with whether or not the detection block has detected a linear flaw, thereby reducing influence of the horizontal stripe noise by clamping (line average clamping).

SUMMARY OF THE INVENTION

However, noise reduction processing in Japanese Patent Application Publication No. 2013-106186 has not fully been examined. When the horizontal stripe noise occurs over an entire screen, it is necessary to always arithmetically determine the average value in each of the horizontal lines.

The present technique provides a photoelectric conversion device in which noise is more suitably reduced.

An aspect of the technique is: a photoelectric conversion device comprising: a plurality of effective pixels and a plurality of light shielded pixels which are arranged respectively in a plurality of rows and a plurality of columns; a plurality of vertical output lines; and a signal processing circuit, wherein in a period during which pixel signals are output from first light shielded pixels which are first-row light shielded pixels among the plurality of light shielded pixels to a first vertical output line among the plurality of vertical output lines, pixel signals are output from second light shielded pixels which are second-row light shielded pixels among the plurality of light shielded pixels to a second vertical output line among the plurality of vertical output lines, and the signal processing circuit corrects effective pixel signals output from the effective pixels by using a correction signal obtained by performing filtering processing on pixel signals from the first light shielded pixels and on the pixel signals from the second light shielded pixels.

Further features of the present invention will become apparent from the following description of exemplary embodiments with reference to the attached drawings.

BRIEF DESCRIPTION OF THE DRAWINGS

FIG. 5B is a diagram illustrating the processing by the signal processing circuit according to the third embodiment.

FIG. 6B is a diagram illustrating the processing by the signal processing circuit according to the fourth embodiment.

DESCRIPTION OF THE EMBODIMENTS

Figure 1:
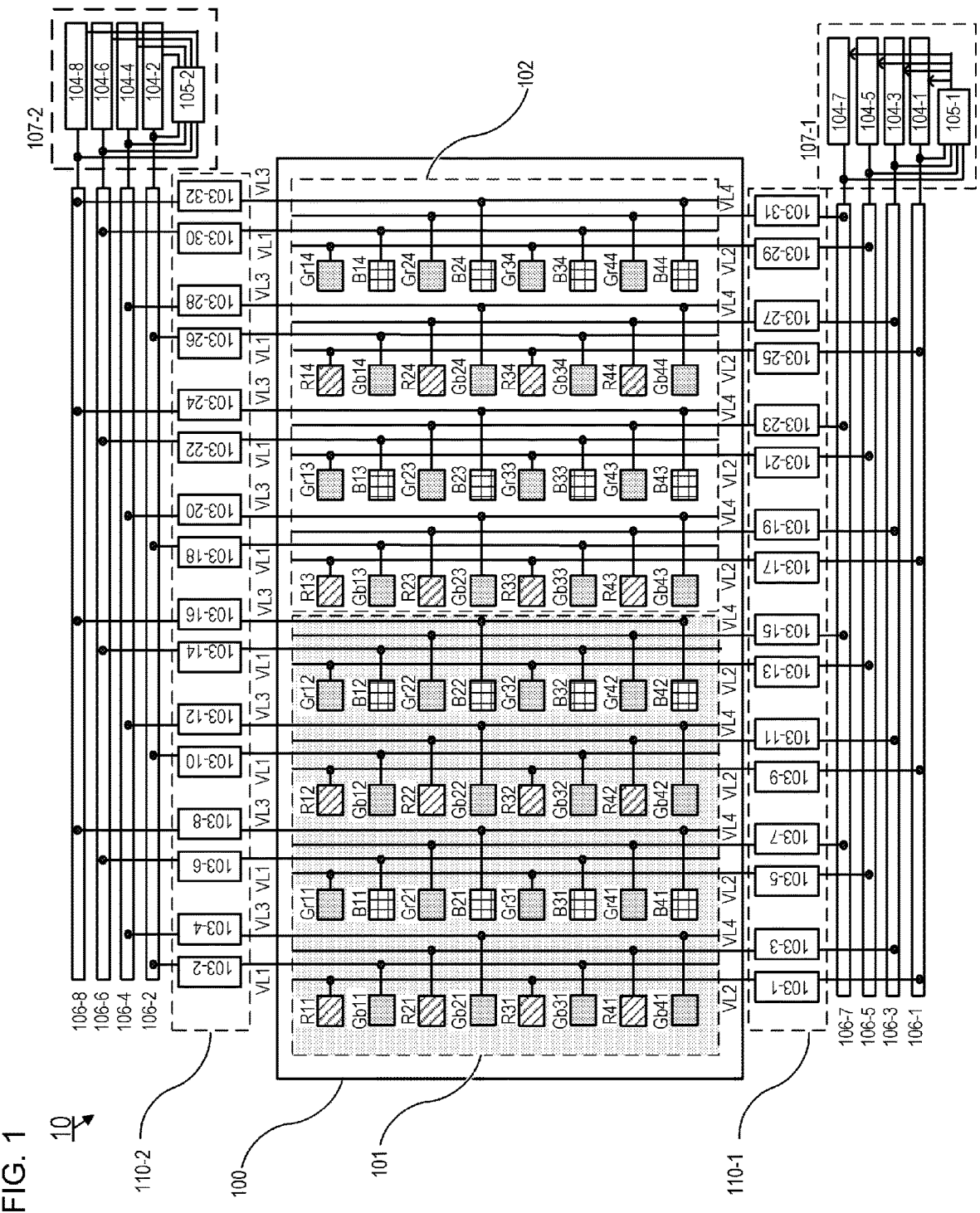
FIG. 1 is a diagram illustrating a circuit configuration of a photoelectric conversion device according to a first embodiment.

Referring to the drawings, the following will describe embodiments according to the present technique. Note that the individual embodiments mentioned above can randomly be combined with each other unless a contradiction occurs. In each of the embodiments described below, an imaging device will mainly be described as an example of a photoelectric conversion device. However, each of the embodiments is not limited to the imaging device, and can also be applied to another example of the photoelectric conversion device. Examples of the photoelectric conversion device include a ranging device (device for focal point detection, distance measurement using time of flight (TOF), or the like), a photometric device (device for measuring an amount of incident light or the like), and the like.

<First Embodiment>: (Configuration of Photoelectric Conversion Device): A description will be given below of a circuit configuration of a photoelectric conversion device 10 (photoelectric conversion device) according to the first embodiment. FIG. 1 illustrates the circuit configuration of the photoelectric conversion device 10 according to the first embodiment. The photoelectric conversion device 10 has a pixel region 100, vertical output lines VL1 to VL4, horizontal read circuits 106-1 to 106-8, signal processing circuits 107-1 and 107-2, and column read circuits 110-1 and 110-2.

The pixel region 100 has a pixel array in the form of an 8-column 8-row matrix (in which pixels are two-dimensionally arranged or which includes pixels in a plurality of columns and a plurality of rows). The pixel region 100 includes a light shielded pixel region 101 and an effective pixel region 102 (aperture pixel region). Each of the light shielded pixel region 101 and the effective pixel region 102 includes 4-column 8-row pixels. Hereinbelow, the pixels included in the light shielded pixel region 101 are referred to as OB (optical black) pixels or light shielded pixels, while the pixels included in the effective pixel region 102 are referred to as effective pixels (aperture pixels). In addition, correcting signals from the effective pixels (effective pixel signals) by using a signal resulting from averaging of signals from the OB pixels (light shielded pixel signals) or the like is referred to as "clamping (OB clamping)". Note that an arrangement of the pixels (the number of the pixels) in each of the pixel region 100, the light shielded pixel region 101, and the effective pixel region 102 is not limited to that described above, and may also be a two-dimensional arrangement of any given number of the pixels as long as the effective pixels and the OB pixels are present in the same row in the pixel region 100.

The pixel region 100 has color filters in a Bayer arrangement. In FIG. 1, R represents a red pixel, Gr and Gb represent green pixels, and B represents a blue pixel. Also, in FIG. 1, in accordance with the 8-column 8-row matrix, numbers corresponding to pixel locations of the pixels R11 to B44 are given thereto.

The vertical output lines VL1 to VL4 are disposed for each one of columns in the pixel arrangement. The vertical output lines VL1 to VL4 corresponding to all the columns allow signals to be acquired (read) from the pixels in all the columns in the pixel region 100.

The column read circuits 110-1 and 110-2 read the signals acquired (read) by the vertical output lines VL1 to VL4. The column read circuits 110-1 and 110-2 include circuits of a current source for the vertical output lines VL1 to VL4, column gain amplifiers, column ADs, column memories, and the like. Note that, in the first embodiment, column circuits each corresponding to one of the columns and to one of the vertical output lines in the column read circuits 110-1 and 110-2 are referred to as column read units 103-1 to 103-32.

The horizontal read circuits 106-1 to 106-8 read signals read by the column read circuits 110-1 and 110-2 correspondingly to the individual columns of the pixels. Thus, the photoelectric conversion device 10 has the eight horizontal read circuits 106-1 to 106-8. The following will respectively refer to the eight horizontal read circuits 106-1 to 106-8 as channels 1ch to 8ch. In the first embodiment, each of the pixel signals read by the vertical output lines VL1 to VL4 is divided into the two channels.

The signal processing circuits 107-1 and 107-2 process the signals read by the horizontal read circuits 106-1 to 106-8. The signal processing circuits 107-1 and 107-2 include processing circuits 104-1 to 104-8 that perform signal processing for the individual channels and processing circuits 105-1 and 105-2 that perform common processing for the plurality of channels.

Figure 2:
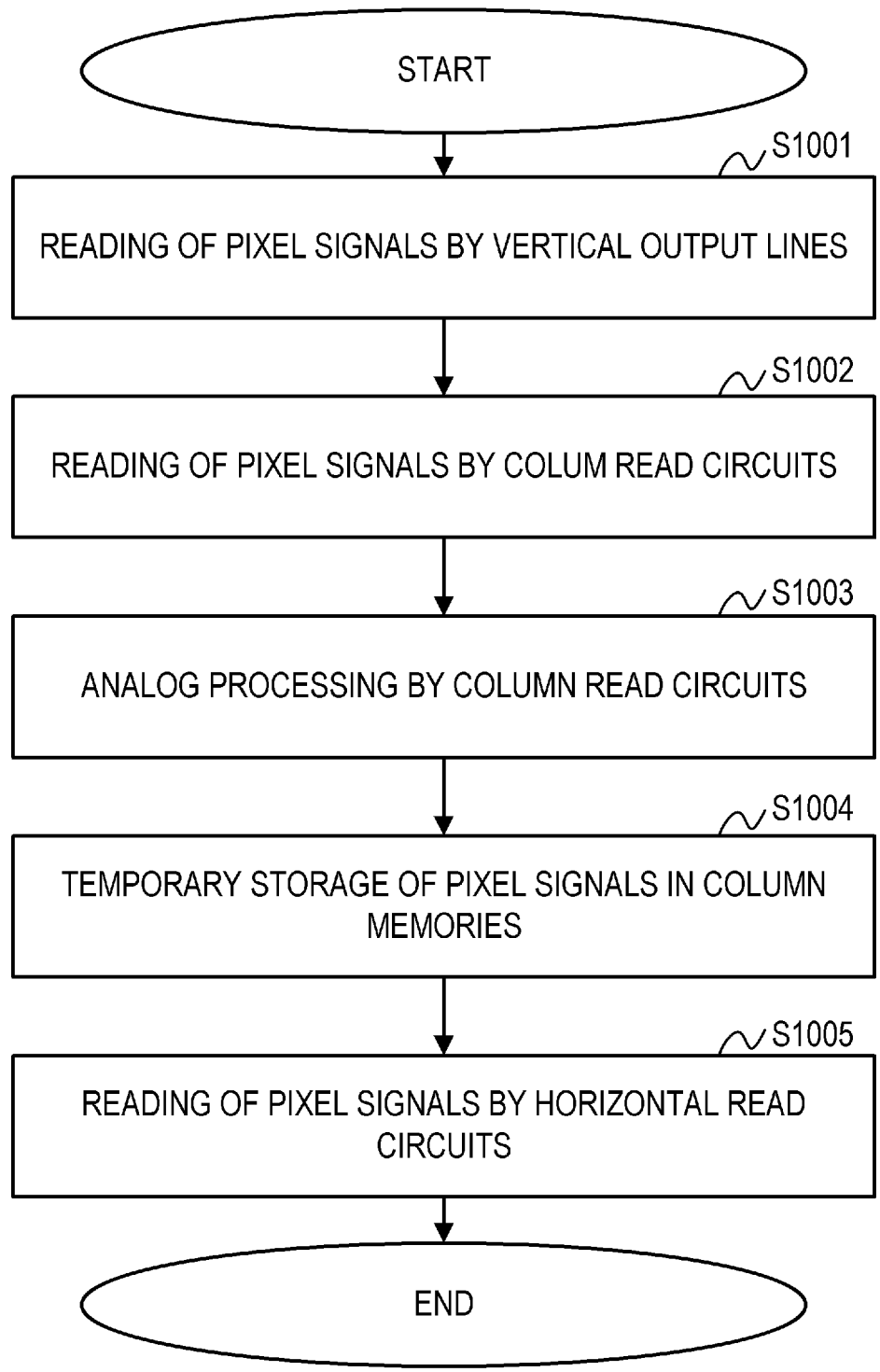
FIG. 2 is a flow chart of processing of reading pixel signals according to the first embodiment.

(Method of Reading Pixel Signals): Next, referring to the circuit configuration diagram in FIG. 1 and the flow chart in FIG. 2, a description will be given of a reading method before the horizontal read circuits 106-1 to 106-8 read pixel signals.

(S1001): From 32 pixels in 8 columns and 4 rows corresponding to pixels R11 to B24, signals (pixel signals) are simultaneously read (acquired) by the vertical output lines VL1 to VL4. In the first embodiment, the pixel signals are read from the first-row pixels (pixels R11 to Gr14) by the vertical output lines VL2, and the pixel signals are read from the second-row pixels (pixels Gb11 to B14) by the vertical output lines VL1. Likewise, the pixel signals are read from the third-row pixels (pixels R21 to Gr24) by the vertical output lines VL4, and the pixel signals are read from the fourth-row pixels (pixels Gb21 to B24) by the vertical output lines VL3. Note that the signals from the 32 pixels corresponding to the pixels R11 to B24 are controlled to be read at the same timing (during the same period) into the corresponding vertical output lines. For example, during a period during which the pixel signals are read from the first-row pixels by the vertical output lines VL2, the pixel signals are read from the third-row pixels by the vertical output lines VL4.

(S1002): Of the pixel signals read from the 32 pixels by the vertical output lines VL1 to VL4, the pixel signals are read from the 16 pixels into the column read circuit 110-1 and the pixel signals are read from the 16 pixels into the column read circuit 110-2. In the first embodiment, the pixel signals read by the vertical output lines VL1 and VL3 are read into the column read circuit 110-2, and the pixel signals read by the vertical output lines VL2 and VL4 are read into the column read circuit 110-1. Note that the reading of the pixel signals by the column read circuits 110-1 and 110-2 is also controlled such that the pixel signals are substantially simultaneously read (during the same period) from the 32 pixels.

(S1003): The column read circuits 110-1 and 110-2 perform, on the read pixel signals, analog processing such as signal amplification or AD conversion processing. At this time, the signal amplification or the AD conversion processing is controlled to be performed at substantially the same timing (during the same period) on the pixel signals from the vertically separated 32 pixels.

Note that, there is a method which performs, depending on a pixel signal reading technique used by the photoelectric conversion device 10, reading by performing multisampling or an operation of giving an offset to each of the columns to reduce random noise and fixed pattern noise. Such a method also includes an example of driving which delays timing control for the sake of convenience. However, it can be said that the analog processing performed on the pixel signals from the 32 pixels in S1003 has sufficiently high simultaneity compared to that of timing of reading the pixel signals from the subsequent 32 pixels (pixels R31 to B44).

(S1004): The pixel signals from the 32 pixels are simultaneously stored (during the same period) temporarily in column memories of the column read circuits 110-1 and 110-2.

(S1005): The horizontal read circuits 106-1 to 106-8 sequentially read the pixel signals from a set of eight pixels and then from another set of eight pixels. In the first embodiment, the pixel signals after being subjected to the analog processing by the column read circuit 110-1 are read by the horizontal read circuits 106-1, 106-3, 106-5, and 106-7. Meanwhile, the pixel signals after being subjected to the analog processing by the column read circuit 110-2 are read by the horizontal read circuits 106-2, 106-4, 106-6, and 106-8.

After the processing in S1005 is ended, the same processing as in S1001 to S1005 is performed on the subsequent 4-row 8-column 32 pixels corresponding to the pixels R31 to B44.

In such a case where the analog processing such as the signal amplification or the AD conversion processing is performed herein in S1003, noise (horizontal stripe noise) resulting from power source or GND (ground or earth) fluctuations occurs. As long as operations ranging from the reading of the pixel signals from the pixels to the temporary storage thereof in the column memories are performed at the same timings, amounts of the horizontal stripe noise in the pixel signals from the individual pixels are on the same level in principle.

Accordingly, when the reading method according to the first embodiment is used, the pixel signals from the 8-column 4-row pixels R11 to B24 have identical horizontal stripe noises, while the pixel signals from the 8-column 4-row pixels R31 to B44 have another identical horizontal stripe noises.

To remove these horizontal stripe noises, there is a method which obtains an average value of the pixel signals from the OB pixels present in the same row and calculates differences between the pixel signals from the effective pixels and the average value. However, when the average value of the pixel signals from the OB pixels is to be obtained, the average value is affected by random noise independent from each OB pixel (independent from one OB pixel to another). Accordingly, to extract only the horizontal stripe noise resulting from the power source or GND fluctuations from the OB pixels, it is desirable to average the pixel signals from a large number of the OB pixels and reduce the influence of the random noise.

In general, the horizontal stripe noise resulting from the power source or GND fluctuations is significantly small compared to the random noise resulting from the pixels. However, since the horizontal stripe noise seems like a horizontal line unlike the random noise, the horizontal stripe noise greatly affects an image quality even though the noise level thereof is low.

For example, to reduce an estimated error of the horizontal stripe noise in each of the image signals after being averaged to 1/10 of an estimated error of the horizontal stripe noise in each of the pixel signals from the OB pixels before being averaged, it is necessary to perform averaging by using a large number of the OB pixels present in the same row. In the first embodiment, there are four OB pixels in each one of the rows, but the number of the pixels required for the averaging for sufficiently reducing the estimated error is generally about 50 to 100. Accordingly, the number of the pixels in each one of the rows, which is 4, is not sufficient to remove the horizontal stripe noise. However, increasing the number of the OB pixels in a horizontal direction, which leads to a cost increase, deterrent to a higher-speed operation, or the like, may be unrealistic.

Figure 3:
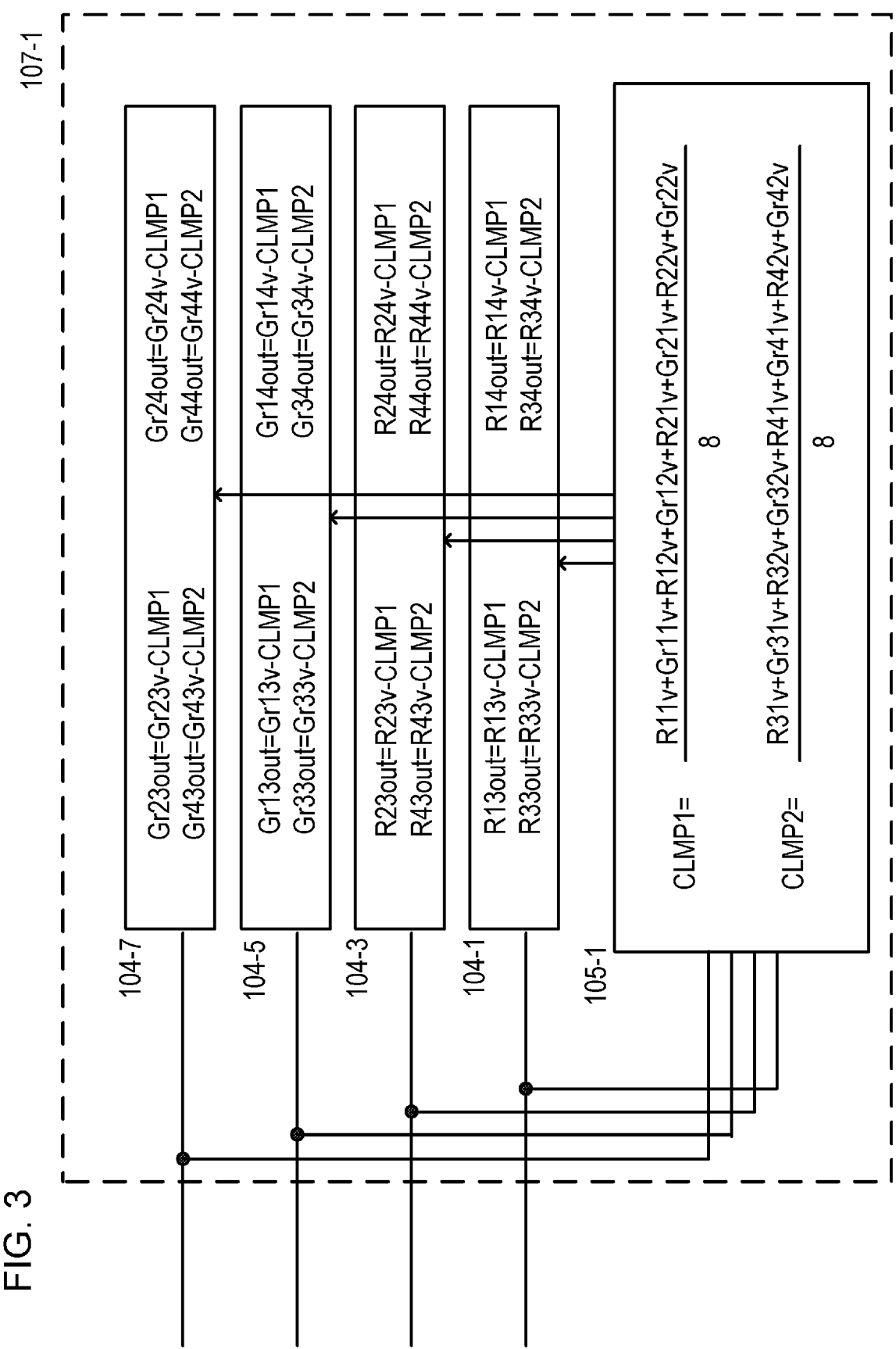
FIG. 3 is a diagram illustrating processing by a signal processing circuit according to the first embodiment.

(Processing by Signal Processing Circuit): Referring to FIG. 3, a detailed description will be given of clamping processing for removing horizontal stripe noise components from the pixel signals (effective pixel signals) from the effective pixels, which are performed by each of the signal processing circuits 107-1 and 107-2 according to the first embodiment. FIG. 3 is a diagram illustrating a portion of the processing by the signal processing circuit 107-1. Note that, since the processing by the signal processing circuit 107-2 is the same as the processing by the signal processing circuit 107-1, a description thereof is omitted.

Note that, in FIG. 3, each of signal values of the pixel signals input to the signal processing circuit 107-1 has "v" at the end thereof. For example, a signal value of the pixel signal from the pixel R23 is represented by "R23v". Meanwhile, each of signal values of the pixel signals after being subjected to the clamping processing has "out" at the end thereof. For example, a signal value of the pixel signal from the pixel Gr23 after being subjected to the clamping processing is represented by "Gr23out".

The signal processing circuit 107-1 receives the pixel signals from the horizontal read circuits 106-1, 106-3, 106-5, and 106-7 and performs digital signal processing on the pixel signals. The signal processing circuit 107-1 performs a digital S-N operation, subtraction processing for digital OB clamping, a black level offset adding processing, and the like.

In the first embodiment, the signal processing circuit 107-1 has the processing circuits 104-1, 104-3, 104-5, and 104-7 that process signals for the individual channels and the processing circuit 105-1 that performs common processing for the four channels. A description will be given herein of expressions shown in the processing circuits 104-1, 104-3, 104-5, and 104-7 and the processing circuit 105-1 in FIG. 3. The upper expressions shown in the individual processing circuits in FIG. 3 represent processing at a time at which the pixel signals are read from the pixels R11 to Gr14 and R21 to Gr24, while the lower expressions shown therein represent processing at a time at which the pixel signals are read from the pixels R31 to Gr34 and R41 to Gr44.

To the processing circuit 104-1, the pixel signal is input from the horizontal read circuit 106-1 while, to the processing circuit 104-3, the pixel signal is input from the horizontal read circuit 106-3. Likewise, to the processing circuit 104-5, the pixel signal is input from the horizontal read circuit 106-5 while, to the processing circuit 104-7, the pixel signal is input from the horizontal read circuit 106-7. To the processing circuit 105-1, the pixel signals are input from all the horizontal read circuits 106-1, 106-3, 106-5, and 106-7.

The processing circuit 105-1 averages (performs filtering processing on) the pixel signals from the OB pixels in four channels to obtain, as a value common to the individual channels, a clamp value CLMP. The clamp value CLMP is calculated for each of the rows from which the pixel signals are simultaneously read. The clamp value CLMP according to the first embodiment is a signal value (correction signal) representing the horizontal stripe noise component specific to each timing. In FIG. 3, an average value of the pixel signals simultaneously read from the OB pixels R11 to Gr12 and R21 to Gr22 serves as a clamp value CLMP1, while an average value of the pixel signals simultaneously read with the subsequent timing from the OB pixels R31 to Gr32 and R41 to Gr42 serves as a clamp value CLMP2. For example, the clamp value CLMP1 corresponds to a value obtained by averaging signal values R11$v$, Gr11$v$, R12$v$, Gr12$v$, R21$v$, Gr21$v$, R22$v$, and Gr22$v$ of the pixel signals from the OB pixels. Note that the processing circuit 105-1 outputs the clamp value CLMP to the processing circuits 104-1, 104-3, 104-5, and 104-7.

Each of the processing circuits 104-1, 104-3, 104-5, and 104-7 performs processing (clamping processing) of subtracting the clamp value CLMP from each of the pixel signals from the effective pixels input thereto. For example, to the processing circuit 104-1, signal values R13v and R14v of the pixel signals from the effective pixels R13 and R14 are input from the horizontal read circuit 106-1 and the clamp value CLMP1 is input from the processing circuit 105-1. Consequently, the processing circuit 104-1 subtracts the clamp value CLMP1 from each of the signal values R13v and R14v of the pixel signals to acquire signal values R13out and R14out of the pixel signals after the clamping processing.

In the first embodiment, attention is given herein to the fact that, when the pixel signals are simultaneously read from the pixels in the plurality of rows, the horizontal stripe noise in each of the image signals is on the same noise level as that of the noise component resulting from the power source or GND fluctuations. As a result, even the pixels (pixels in the different rows) corresponding to the different vertical output lines can be used for the averaging processing, and accordingly the average value can be acquired from the pixel signals from a large number of the pixels. Therefore, even when a large number of the OB pixels are not present in the horizontal direction, it is possible to compress the influence of the random noise in the averaging of the pixel signals from the OB pixels. In other words, it is possible to accurately remove the horizontal stripe noise from the pixel signals from the effective pixels.

For example, when the number of the vertical output lines is 4 and the OB pixels are in 100 columns, even though the upper two vertical output lines and the lower two vertical output lines separately perform reading, it is possible to obtain an average of the pixel signals from the 200 pixels. In this case, it is possible to reduce the estimated error of the horizontal stripe noise in each of the pixel signals after being averaged to $1/\sqrt{200}$, i.e., about $1/14$ of the estimated error of the horizontal stripe noise in a case where averaging is not performed.

In the example shown in the first embodiment, the number of the vertical output lines for the pixels in each one of the columns is 4, but the same effect can be obtained as long as the number of the vertical output lines for the pixels in each one of the columns is at least 2. Note that, since the number of the vertical output lines for the pixels in each one of the columns indicates the number of the rows from which the pixel signals can simultaneously be read, a higher effect is achieved as the number of the vertical output lines is larger, e.g., 8, 12, or the like. Preferably, the vertical output lines VL1 to VL4 acquire the pixel signals from the effective pixels the number of which is the same as the number of the OB pixels. However, as long as the vertical output lines VL1 to VL4 acquire the plurality of pixel signals from the plurality of OB pixels present extensively in the plurality of rows and the pixel signals from the effective pixels in at least any of the plurality of rows with the same timing, it is possible to perform the clamping processing on the effective pixels.

While the signal processing is performed separately by the two signal processing circuits 107-1 and 107-2, it may also be possible that one signal processing circuit collectively performs signal processing on the pixel signals from all the pixels. Also, in the first embodiment, a simple average is used for the averaging (filtering processing), but the effect of the first embodiment can be obtained even when, e.g., a median value is used, averaging is performed after pixel signals from defective pixels are removed, or an average value weighted using a filter is used.

<Second Embodiment>: In most cases, due to limitations placed on a layout in a pixel region, the plurality of vertical output lines have different wiring capacities. Even the same vertical output lines have different characteristics depending on whether the vertical output lines are connected to the R pixels or to the Gr pixels. To correct such a characteristic difference of the vertical output lines or different colors, clamping processing of correcting differences (offsets) between the individual channels may be performed by acquiring an average value of the pixel signals from the OB pixels in each of the channels and subtracting the average value from each of the pixel signals from the effective pixels.

Such clamping processing of removing noise for each of the channels can be combined with the clamping processing of removing the horizontal stripe noise described in the first embodiment. Therefore, in the second embodiment, a description will be given of the photoelectric conversion device 10 that performs such two types of clamping processing. Note that, to discriminate the "clamping processing of removing the horizontal stripe noise" from the "clamping processing of removing the noise for each of the channels", the "clamping processing of removing the noise for each of the channels" is hereinafter referred to as the "offset correction".

Figure 4:
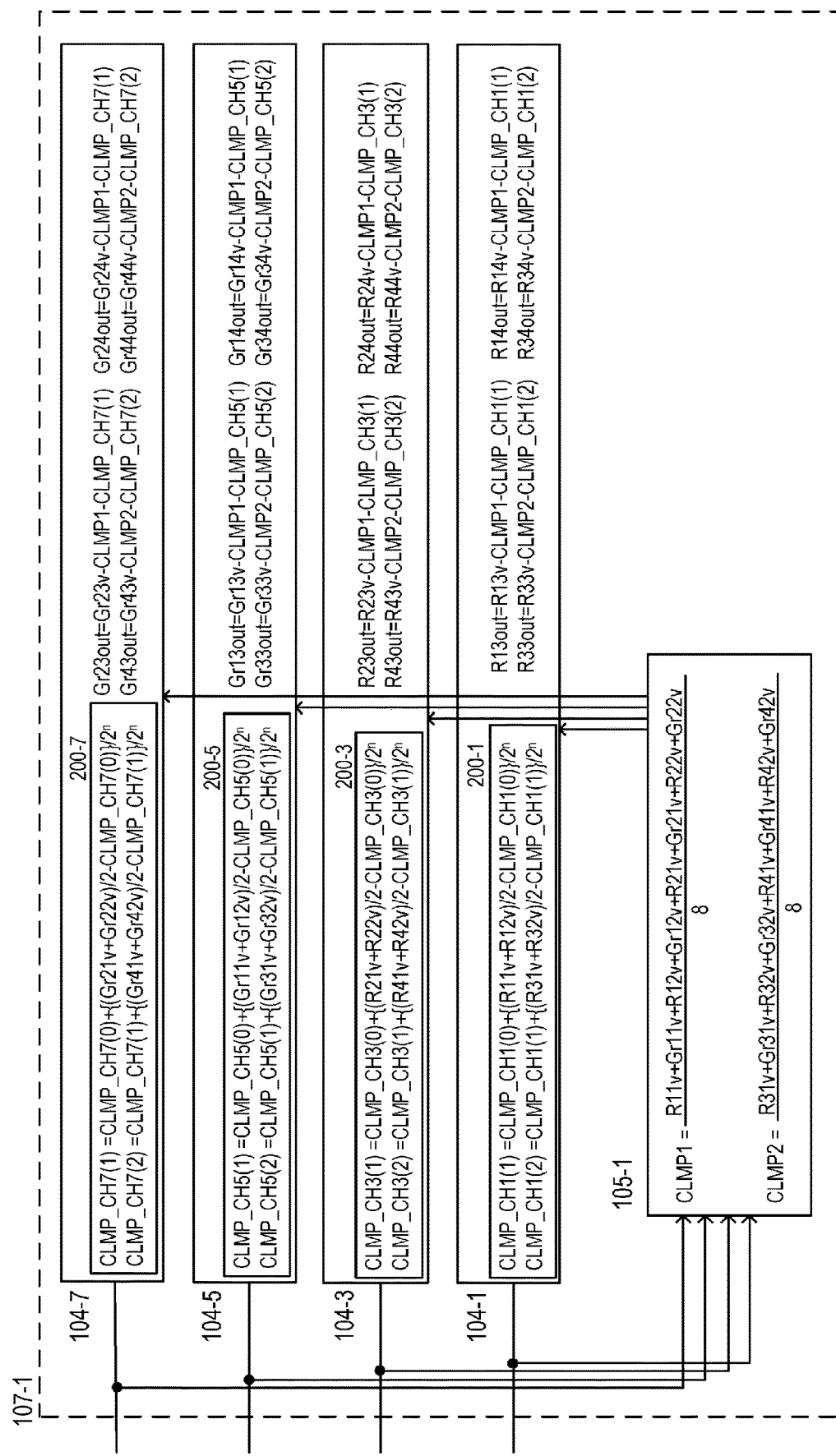
FIG. 4 is a diagram illustrating processing by a signal processing circuit according to a second embodiment.

FIG. 4 is a diagram illustrating processing by the signal processing circuit 107-1 according to the second embodiment. Note that, since processing by the signal processing circuit 107-2 is the same as the processing by the signal processing circuit 107-1, a detailed description thereof is omitted. In the same manner as in the first embodiment, the signal processing circuit 107-1 has the processing circuits 104-1, 104-3, 104-5, and 104-7 and the processing circuit 105-1. The signal processing circuit 107-2 has the processing circuits 104-2, 104-4, 104-6, and 104-8 and the processing circuit 105-2. In the second embodiment, each of the processing circuits 104-1 to 104-8 has any of circuits 200-1 to 200-8 corresponding thereto.

Each of circuits 200-1, 200-3, 200-5, and 200-7 is a circuit which calculates an average of the pixel signals from the OB pixels in each of the channels as the clamp value (correction value). Since it is aimed herein at removing, from each of the pixel signals from the effective pixels, the clamp value differing from one of the channels to another (or one of the vertical output lines to another), the same clamp value is calculated for each of the pixel signals read from the effective pixels in the same channel. Note that, to discriminate the "clamp value according to the first embodiment" from the "clamp value differing from one channel to another", the "clamp value differing from one channel to another" is hereinafter referred to as the "offset level", while the "clamp value according to the first embodiment" is referred to as the "clamp value".

In the second embodiment, the offset level is represented by any of CLMP_CH1(0) to CLMP_CH7(2). In an offset level CLMP_CHi(t), "t" represents timing (a time) at which the pixel signal is read from the pixel, while "i" represents the channel. For example, the offset level for the pixel signal which is read at timing t1 and obtained by the processing circuit 104-3 from the channel 3ch (horizontal read circuit 106-3) is represented by CLMP_CH3(1).

A description will be given of expressions shown in the circuits 200-1, 200-3, 200-5 and 200-7 and the processing circuit 105-1 in FIG. 4. The upper expressions shown in the individual circuits and the processing circuit in FIG. 4 represent processing at a time t=1 at which the pixel signals are read from the pixels R11 to Gr14 and R21 to Gr24. The lower expressions shown therein represent processing at a time t=2 at which the pixel signals are read from the pixels R31 to Gr34 and R41 to Gr44.

(Processing by Signal Processing Circuit): A description will be given below of processing by the signal processing circuit 107-1 when the pixel signals from the pixels R11 to Gr14 and the R21 to Gr24 are input to the signal processing circuit 107-1.

First, in the same manner as in the first embodiment, the processing circuit 105-1 calculates the clamp value CLMP1 (correction signal) and outputs the clamp value CLMP1 to the processing circuits 104-1, 104-3, 104-5, and 104-7. Note that the clamp value CLMP2 can also be calculated in the same manner as in the first embodiment.

Then, the circuits 200-1, 200-3, 200-5, and 200-7 obtain values by subtracting the preceding (immediately previous) offset levels from average values of the pixel signals from the OB pixels in the individual channels that have been input to the signal processing circuit 107-1 and dampens (reduces) the values after the subtraction. Then, the circuits 200-1, 200-3, 200-5, and 200-7 calculate, as new offset levels, values by adding the dampened values to the preceding offset levels. In the second embodiment, an amount of dampening is set to $2^{-n}$ where n is a number larger than 0. For example, when n=5 is satisfied, the amount of dampening is given by $2^{-5}=\frac{1}{32}$. Accordingly, the circuits 200-1, 200-3, 200-5, and 200-7 dampen differences between the average values of the pixel signals from the OB pixels in the individual channels and the preceding offset levels to $\frac{1}{32}$ and obtain sums of the preceding offset levels and the dampened values. At this time, when n is a natural number, it is possible to simplify a configuration of the processing circuit.

Specifically, an example in which the offset level CLMP_CH1(1) is calculated will be described. First, the circuit 200-1 calculates a value by subtracting CLMP_CH1(0) corresponding to the immediately previous offset level from an average value of the signal values R11v and R12v from the OB pixels R11 and R12 and calculates a value by multiplying the value resulting from the subtraction by $2^{-n}$. Then, the circuit 200-1 determines a value obtained by adding the value resulting from the multiplication to CLMP_CH1(0) to be CLMP_CH1(1). Specifically, CLMP_CH1(1) has a value obtained by adding up a value obtained by multiplying CLMP_CH1(0) by $\frac{31}{32}$ and a value obtained by multiplying (R11v+R12v)/2 by $\frac{1}{32}$.

For example, t, (t-1), and (t-2) are respectively defined as a given time, a time immediately previous to t, and a time immediately previous to (t-1), Ave(t) is defined as an average value of the signal values of the pixel signals from the OB pixels in a channel ich at the time t, and a is defined as an amount of dampening. As a result, CLMP_CHi(t)=Ave(t)×α+Ave(t-1)×α(1-α)+Ave(t-2)×α(1-α)$^2$+Ave(t-3)×α(1-α)$^3$+ . . . is satisfied. In other words, average values of the pixel signals from the OB pixels in a given channel at a plurality of times are weighted on a per time basis, and a value (synthetic value) obtained by synthesizing the weighted average values is used as the offset level to be used for the pixel signals from the effective pixels in the channel. It is to be noted herein that, as the times at which the weighting is performed are closer to a current time, weights used for the weighting are increasingly larger. By performing such processing, the horizontal stripe noise is satisfac-torily removed from the offset level, and the offset level can have only a noise (random noise) component specific to each channel.

Finally, the processing circuits 104-1, 104-3, 104-5, and 104-7 subtract, from the target pixel signals, the clamp values CLMP1 obtained from the processing circuit 105-1 and the new offset levels calculated by the circuits 200-1, 200-3, 200-5, and 200-7. For example, the processing circuit 104-1 subtracts, for the effective pixel R13, the clamp value CLMP1 and the offset level CLMP_CH1(1) from the signal value R13v to obtain a signal value R13out of the pixel signal after the correction.

Thus, in the second embodiment, in the calculation of the new offset levels, follow-up amounts to be added to the immediately previous offset levels are dampened by given amounts. Consequently, from the new offset levels, the horizontal stripe noise is satisfactorily removed to provide signal values each having only the noise (fandom noise) component specific to each channel. By using such offset levels, it is possible to reduce the influence of noise specific to each channel which is exerted on the effective pixels through offset correction using the OB pixels. The noise component specific to each channel is the same in any of the rows as long as the channel is the same irrespective of the read timing, and therefore the influence of the random noise on the effective pixels is reduced by using the plurality of read timings.

Thus, each of the circuits 200-1, 200-3, 200-5, and 200-7 extracts the noise component specific to each channel, and the processing circuit 105-1 extracts the horizontal stripe noise specific to each simultaneous read timing. Then, by subtracting the noise component specific to each channel and the horizontal stripe noise from each of the pixel signals from the effective pixels, it is possible to remove both of the noise component specific to each channel and the horizontal stripe noise component specific to each simultaneous read timing. In other words, it is possible to reduce a larger amount of noise from each of the pixel signals from the effective pixels than in the first embodiment.

Note that the extraction of the noise components specific to each channel and the extraction of the horizontal stripe noise specific to each timing are extraction of components independent of each other, and therefore either processing may be performed first.

<Third Embodiment>: In recent years, in order to further increase a speed of reading the pixel data, attention is given to a technique of increasing the number of the vertical output lines. This is the technique of increasing the number of the vertical output lines to increase the number of data sets to be read at a time and reduce the number of times reading is performed per frame.

However, when the technique of increasing the number of the vertical output lines and the second embodiment are used in combination, it is possible to correct the clamp value differing from one channel to another (or from one vertical output line to another), but a problem arises in that it is difficult to correct a vertical shading component. The vertical shading component according to the third embodiment refers to a black level continuously varying in a vertical direction (row direction). The vertical shading component is formed due to, e.g., a power source impedance difference or the like.

The offset level according to the second embodiment is updated only in units of rows on which reading is simultaneously performed. Accordingly, as the number of the rows on which reading is simultaneously performed is increased by the technique of increasing the number of the vertical output lines, a frequency of updating of the correction value per row decreases. For example, when simultaneous reading is performed on two rows, the correction value is updated once for every two rows. However, when simultaneous reading is performed on ten rows, the correction value is updated only once for every ten rows. As a result, as the number of the vertical output lines is increased, accuracy of the correction of the vertical shading component decreases.

To prevent this, in the third embodiment, the photoelectric conversion device 10 calculates the offset level serving as the clamp value specific to each channel and then calculates a clamp value specific to each row to perform correction by using these two correction values. This achieves both of removal of the noise component specific to each channel and removal of the noise component specific to each row.

Note that, to discriminate the "offset level" serving as the "clamp value (correction signal) specific to each channel" from the "clamp value specific to each row", the following will refer to "the clamp value specific to each row" as a "shading level".

Figure 5A:
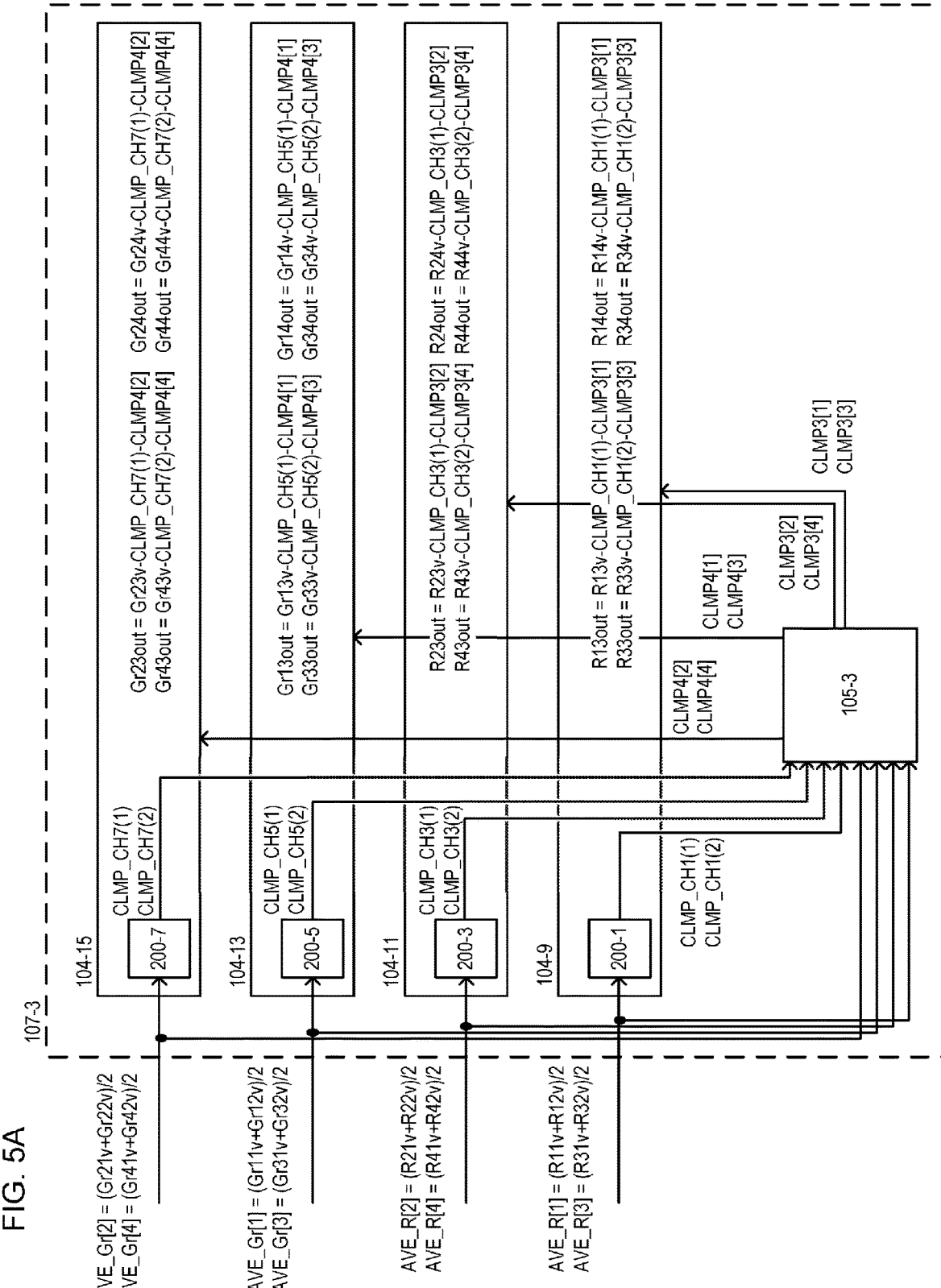
FIG. 5A is a diagram illustrating processing by a signal processing circuit according to a third embodiment.

The third embodiment will describe a device obtained by respectively replacing the signal processing circuits 107-1 and 107-2 of the photoelectric conversion device 10 in FIG. 1 with signal processing circuits 107-3 and 107-4. FIG. 5A is a diagram illustrating processing by the signal processing circuit 107-3 according to the third embodiment. Note that processing by the signal processing circuit 107-4 is the same as the processing by the signal processing circuit 107-3, and therefore a detailed description thereof is omitted. The signal processing circuit 107-3 includes processing circuits 104-9, 104-11, 104-13, and 104-15 and a processing circuit 105-3. Also, in the third embodiment, in the same manner as in the second embodiment, the processing circuits 104-9, 104-11, 104-13, and 104-15 have the corresponding circuits 200-1, 200-3, 200-5, and 200-7.

In the same manner as in the second embodiment, each of the circuits 200-1, 200-3, 200-5, and 200-7 is the circuit which calculates an average of the pixel signals from the OB pixels in each of the channels as the clamp value (correction value). In the third embodiment also, in the same manner as in the second embodiment, the correction value is referred to as the offset level CLMP_CHi(t).

In the third embodiment, the average value of the pixel signals from the OB pixels in each of the channels is represented by any of AVE_R[1] to AVE_R[4] and AVE_Gr[1] to AVE_Gr[4]. Also, each of the shading levels is represented by any of CLMP3[0] to CLMP3[4] and CLMP4[0] to CLMP4[4]. In AVE_R[y], AVE_Gr[y], CLMP3[y], and CLMP4[y], "y" represents a row number (vertical coordinate) specific to each color.

In FIG. 5B, processing performed in the processing circuit 105-3 is represented by expressions. A description will be given of the expressions shown in FIG. 5B. The upper four expressions shown in the processing circuit 105-3 in FIG. 5B represent processing at the time t=1 at which the pixel signals are read from the pixels R11 to Gr14 and R21 to Gr24. The lower four expressions shown therein represent processing at the time t=2 at which the pixel signals are read from the pixels R31 to Gr34 and R41 to Gr44.

Figure 7:
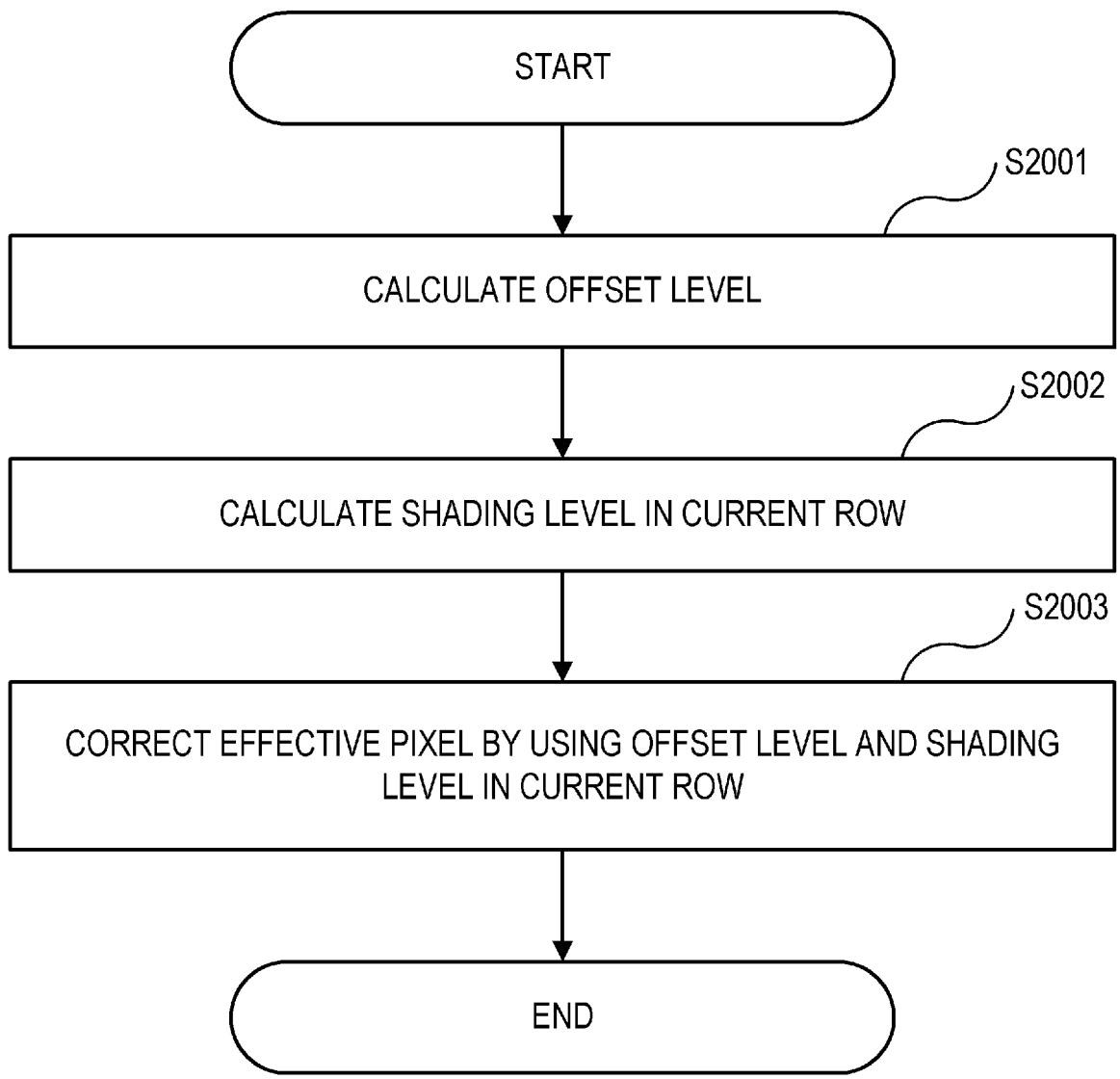
FIG. 7 is a flow chart of the processing by the signal processing circuit according to the third embodiment.

(Processing by Signal Processing Circuit): Referring to FIGS. 5A, 5B, and 7, a description will be given below of processing by the signal processing circuit 107-3 in a case where the pixel signals are input from the pixels R11 to Gr14 and R21 to Gr24 to the signal processing circuit 107-3. FIG. 7 is a flow chart illustrating the processing by the signal processing circuit.

(S2001): First, in the same manner as in the second embodiment, the circuits 200-1, 200-3, 200-5, and 200-7 calculate the offset levels and output the offset levels to the processing circuit 105-3.

(S2002): Then, as illustrated in FIG. 5B, the processing circuit 105-3 subtracts, from the average values of the pixel signals from the OB pixels in the individual channels input to the signal processing circuit 107-3, the offset levels output from the circuits 200-1, 200-3, 200-5, and 200-7. The processing circuit 105-3 further obtains values by subtracting the preceding (immediately previous) shading levels from values (correction signals) obtained by subtracting the offset levels (first synthetic values) from the average values of the pixel signals from the OB pixels in the individual channels, and dampens (reduces) the values after the subtraction. Then, the processing circuit 105-3 adds the dampened values to the preceding shading levels to calculate the values resulting from the addition as new shading levels (second synthetic values).

(S2003): Finally, the processing circuits 104-9, 104-11, 104-13, and 104-15 correct the target pixel signals by using the shading levels calculated by the processing circuit 105-3 and the offset levels calculated by the circuits 200-1, 200-3, 200-5, and 200-7.

Specifically, an example in which the shading level CLMP3 [2] is calculated to correct the pixel signal of the effective pixel R23 will be described.

First, as illustrated in FIG. 5B, the processing circuit 105-3 subtracts, from the average value AVE_R[1] of the signal values R11v and R12v of the OB pixels R11 and R12, the offset level CLMP_CH1(1) calculated by the circuit 200-1. Then, the processing circuit 105-3 calculates a value by subtracting CLMP3[0] corresponding to the shading level in the preceding row from a value obtained by subtracting the offset level CLMP_CH1(1) from the average value AVE_R[1], and calculates a value by multiplying the value resulting from the subtraction by $2^{-n}$.

Next, the processing circuit 105-3 determines a value obtained by adding the value resulting from the multiplication to the shading level CLMP3 [0] to be a shading level CLMP3[1]. Then, the processing circuit 105-3 subtracts, from an average value AVE_R[2] of the signal values R21v and R22v from the OB pixels R21 and R22, the offset level CLMP_CH3(1) calculated by the circuit 200-1. Then, the processing circuit 105-3 calculates a value by subtracting CLMP3[1] corresponding to the shading level in the preceding row from a value obtained by subtracting the offset level CLMP_CH3(1) from the average value AVE_R[2], and calculates a value by multiplying the value resulting from the subtraction by $2^{-n}$. Then, the processing circuit 105-3 determines a value (synthesized value or synthetic value) obtained by adding the value resulting from the multiplication to the shading level CLMP3[1] to be the shading level CLMP3[2]. In other words, the processing circuit 105-3 calculates the shading level CLMP3 [2] through filtering processing using the offset levels in at least two channels, i.e., the offset level CLMP_CH1(1) and the offset level CLMP_CH3(1).

Finally, the processing circuit 104-11 subtracts, for the effective pixel 23, the offset level CLMP_CH3(1) and the shading level CLMP3[2] from the signal value R23v to acquire a signal value R23out of the pixel signal after the correction.

By thus calculating the offset level, subsequently calculating the shading level, and performing the correction using these two correction values, both of the removal of the noise component specific to each channel and the removal of the noise component specific to each row are achieved.

In the example shown in the third embodiment, the number of the vertical output lines for the pixels in each one of the columns is 4, but the same effect can be obtained as long as the number of the vertical output lines for the pixels in each one of the columns is at least 2. Note that, since the number of the vertical output lines for the pixels in each one of the columns indicates the number of the rows from which the pixel signals can simultaneously be read, a higher effect is achieved as the number of the vertical output lines is larger, e.g., 8, 12, or the like.

<Fourth Embodiment>: In the third embodiment, each of the calculated offset levels includes a portion of the clamp value specific to each row, and therefore it is impossible to completely separate the offset level from the shading level.

Accordingly, the fourth embodiment performs, before calculating the offset level, additional processing of subtracting the shading level in the preceding row from the average value of the pixel signals from the OB pixels to accurately separate the offset level from the shading level.

Figure 6A:
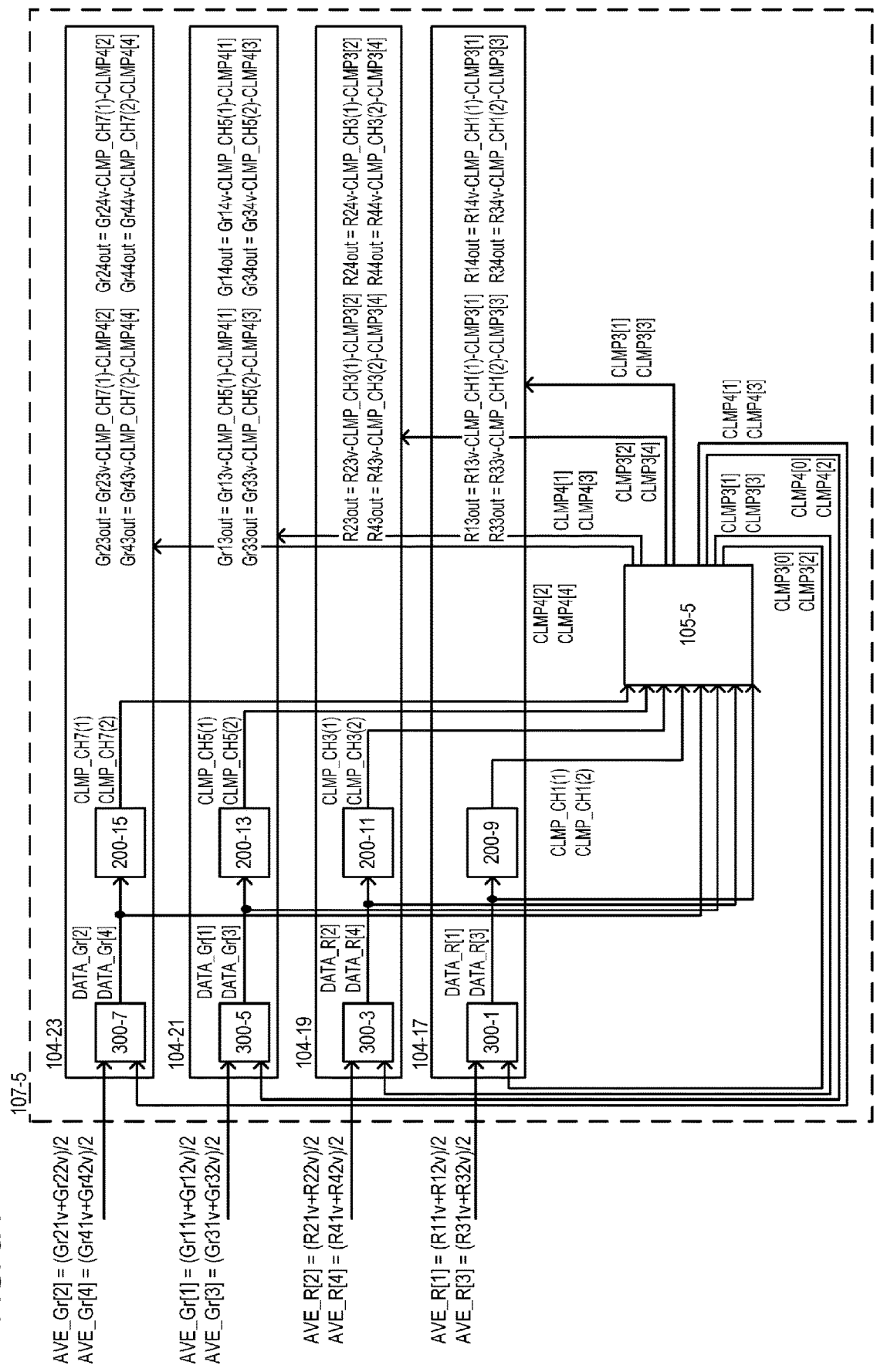
FIG. 6A is a diagram illustrating processing by a signal processing circuit according to a fourth embodiment.

The fourth embodiment will describe a device obtained by respectively replacing the signal processing circuits 107-1 and 107-2 of the photoelectric conversion device 10 in FIG. 1 with signal processing circuits 107-5 and 107-6. FIG. 6A is a diagram illustrating processing by the signal processing circuit 107-5 according to the forth embodiment. Note that processing by the signal processing circuit 107-6 is the same as the processing by the signal processing circuit 107-5, and therefore a detailed description thereof is omitted. The signal processing circuit 107-5 includes processing circuits 104-17, 104-19, 104-21, and 104-23 and a processing circuit 105-5. Also, in the fourth embodiment, the processing circuits 104-17, 104-19, 104-21, and 104-23 have respective circuits 200-9, 200-11, 200-13, and 200-15 corresponding thereto and respective circuits 300-1, 300-3, 300-5, and 300-7.

In the fourth embodiment, a value obtained by subtracting the vertical shading level in the immediately previous (preceding) row from the average value of the pixel signals from the OB pixels is represented by any of DATA_R[1] to DATA_R[4] and DATA_Gr[1] to DATA_Gr[4]. In DATA_R[y] and DATA_Gr[y], "y" represents a row number (vertical coordinate) specific to each color.

In FIG. 6B, processing performed in each of the circuits 300-1, 300-3, 300-5, and 300-7, the circuits 200-9, 200-11, 200-13, and 200-15, and the processing circuit 105-5 is represented by expressions. A description will be given of the expressions shown in FIG. 6B. The upper expressions shown in the circuits 300-1, 300-3, 300-5, and 300-7 and the circuits 200-9, 200-11, 200-13, and 200-15 in FIG. 6B represent processing at the time t=1 at which the pixel signals are read from the pixels R11 to Gr14 and R21 to Gr24. The lower expressions shown therein represent processing at the time t=2 at which the pixel signals are read from the pixels R31 to Gr34 and R41 to Gr44. The upper four expressions shown in the processing circuit 105-3 in FIG. 6B represent processing at the time t=1 at which the pixel signals are read from the pixels R11 to Gr14 and R21 to Gr24. The lower four expressions shown therein represent processing at the time t=2 at which the pixel signals are read from the pixels R31 to Gr34 and R41 to Gr44.

Figure 8:
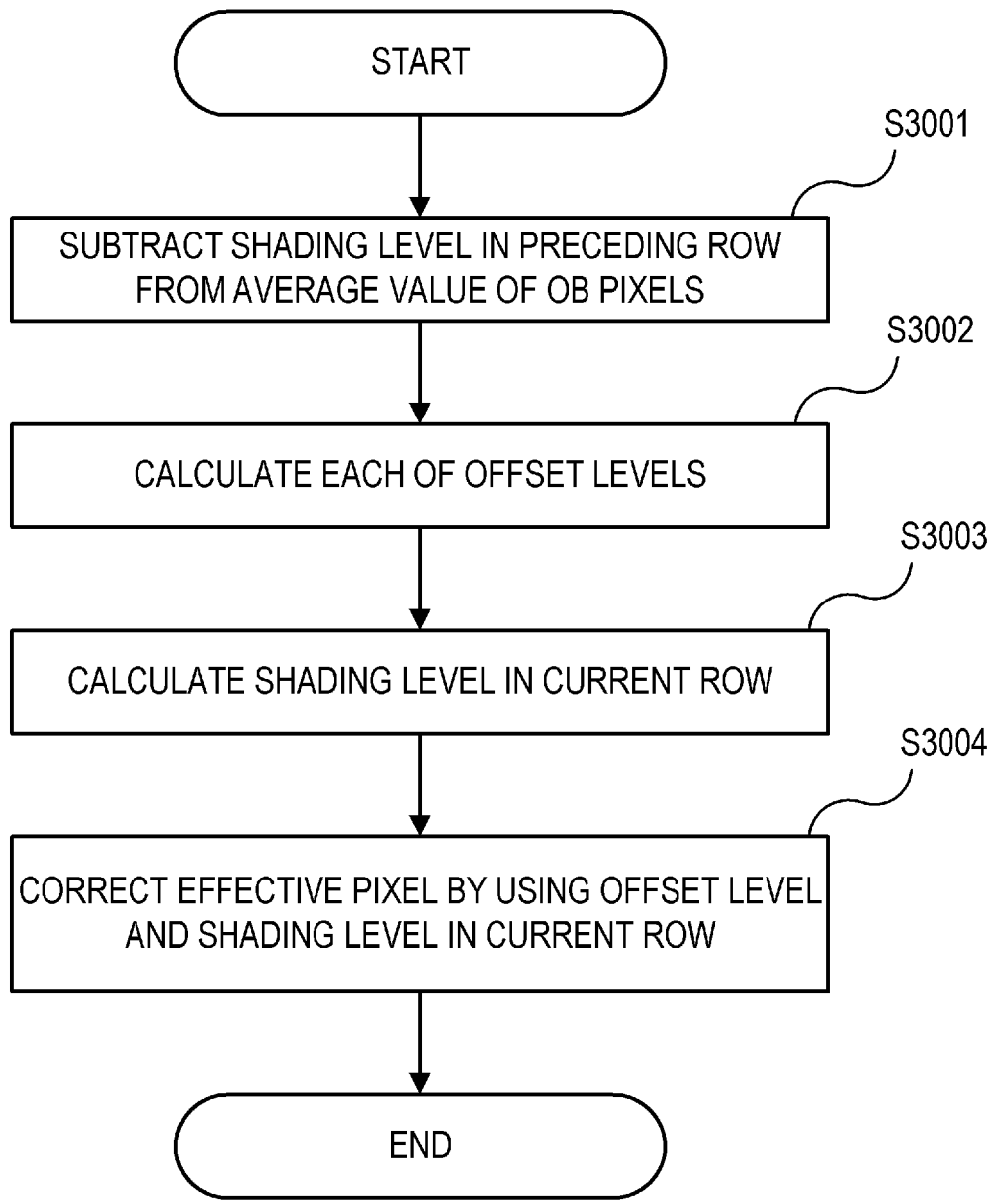
FIG. 8 is a flow chart of the processing by the signal processing circuit according to the fourth embodiment.

(Processing by Signal Processing Circuit): Referring to FIGS. 6A, 6B, and 8, a description will be given below of processing by the signal processing circuit 107-5 in a case where the pixel signals from the pixels R11 to Gr14 and R21 to Gr24 are input to the signal processing circuit 107-5. FIG. 8 is a flow chart illustrating the processing by the signal processing circuit.

(S3001): First, as illustrated in FIG. 6B, the circuits 300-1, 300-3, 300-5, and 300-7 output values obtained by subtracting the shading levels in the immediately previous (preceding) rows from the average values of the pixel signals from the OB pixels in the individual channels that have been input to the signal processing circuit 107-5.

(S3002): Then, as illustrated in FIG. 6B, the circuits 200-9, 200-11, 200-13, and 200-15 calculate the offset levels by using the values output from the circuits 300-1, 300-3, 300-5, and 300-7 and output the offset levels to the processing circuit 105-5.

(S3003): Then, as illustrated in FIG. 6B, the processing circuit 105-5 subtracts, from the values output from the circuits 300-1, 300-3, 300-5, and 300-7, the offset levels output from the circuits 200-9, 200-11, 200-13, and 200-15. Then, the processing circuit 105-5 obtains values by subtracting the preceding (immediately previous) shading levels from the values resulting from the subtraction of the offset levels and dampens (reduces) the values after the subtraction. Then, the processing circuit 105-5 adds the dampened values to the preceding shading levels and calculates values resulting from the addition as new shading levels.

(S3004): The processing circuits 104-17, 104-19, 104-21, and 104-23 correct the target pixel signals by using the shading levels calculated by the processing circuit 105-5 and the offset levels calculated by the circuits 200-9, 200-11, 200-13, and 200-15.

Specifically, an example in which the shading level CLMP3[2] is calculated to correct the pixel signal of the effective pixel R23 will be described.

The circuit 300-1 subtracts CLMP3[0] corresponding to the shading level in the preceding row from the average value AVE_R[1] of the signal values R11$v$ and R12$v$ from the OB pixels R11 and R12 to calculate DATA_R[1]. Likewise, the circuit 300-3 subtracts CLMP3[1] corresponding to the shading level in the preceding row from the average value AVE_R[2] of the signal values R21$v$ and R22$v$ from the OB pixels R21 and R22 to calculate DATA_R[2].

Then, the circuit 200-9 calculates a value by subtracting CLMP_CH1(0) corresponding to the immediately previous offset level from DATA_R[1] calculated by the circuit 300-1, and calculates a value by multiplying the value resulting from the subtraction by $2^{-n}$. Then, the circuit 200-9 determines a value obtained by adding the value resulting from the multiplication to CLMP_CH1(0) to be CLMP_CH1(1). Likewise, the circuit 200-11 calculates a value by subtracting CLMP_CH3(0) corresponding to the immediately previous offset level from DATA_R[2] calculated by the circuit 300-3, and calculates a value by multiplying the value resulting from the subtraction by $2^{-n}$. Then, the circuit 200-11 determines a value obtained by adding the value resulting from the multiplication to CLMP_CH3(0) to be CLMP_CH3(1).

Then, the processing circuit 105-5 calculates a value by subtracting, from DATA_R[1] calculated by the circuit 300-1, the offset level CLMP_CH1(1) calculated by the circuit 200-9 and CLMP3 [0] corresponding to the shading level in the preceding row. Then, the processing circuit 105-5 calculates a value by multiplying the value resulting from the subtraction by $2^{-n}$. Then, the processing circuit 105-5 determines a value obtained by adding the value resulting from the multiplication to CLMP3 [0] to be CLMP3[1]. The processing circuit 105-5 further calculates a value by subtracting, from DATA_R[2] calculated by the circuit 300-3, the offset level CLMP_CH3(1) calculated by the circuit 200-11 and CLMP3 [1] corresponding to the shading level in the preceding row. Then, the processing circuit 105-5 calculates a value by multiplying the value resulting from the subtraction by $2^{-n}$. Then, the processing circuit 105-5 determines a value obtained by adding the value resulting from the multiplication to CLMP3[1] to be CLMP3[2].

Finally, the processing circuit 104-19 subtracts, for the effective pixel R23, the offset level CLMP_CH3(1) and the shading level CLMP3[2] from the signal value R23v to obtain a signal value R23out of the pixel signal after the correction.

By thus subtracting the shading level in the preceding row before the calculation of the offset level, it is possible to accurately separate the offset level from the shading level and perform the correction.

In the example shown in the fourth embodiment, the number of the vertical output lines for the pixels in each one of the columns is 4, but the same effect can be obtained as long as the number of the vertical output lines for the pixels in each one of the columns is at least 2. Note that, since the number of the vertical output lines for the pixels in each one of the columns indicates the number of the rows from which the pixel signals can simultaneously be read, a higher effect is achieved as the number of the vertical output lines is larger, e.g., 8, 12, or the like.

In the example shown in the fourth embodiment, the shading levels are calculated on an individual basis for the different colors, but, when the pixels have the same row number (vertical coordinate), the shading levels may be calculated not on an individual basis for the different colors.

Figure 9:
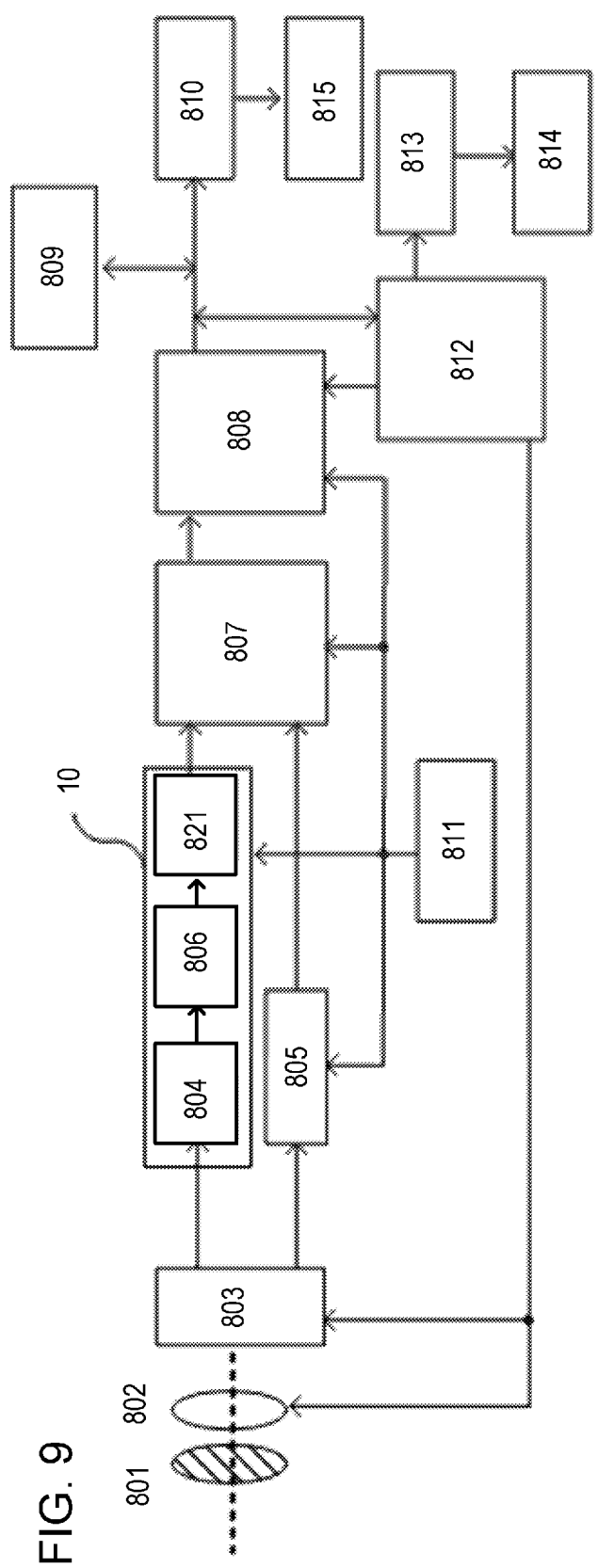
FIG. 9 is a configuration diagram of a camera system according to a fifth embodiment.

<Fifth Embodiment>: FIG. 9 illustrates an example of a configuration of a camera system according to the fifth embodiment, which is a system obtained by incorporating the photoelectric conversion device 10 described in the first embodiment into a digital camera. The digital camera includes the photoelectric conversion device 10, a barrier 801, a lens 802, a diaphragm 803, a sensor 805, a signal processing device 807, a processing unit 808, and a memory unit 809. The digital camera includes an external I/F circuit 810, a timing generation unit 811, an overall control unit 812, a recording medium I/F unit 813, and a recording medium 814. The digital camera is connected to an external computer 815.

In the photoelectric conversion device 10, a solid-state imaging element 804, an A/D converter 806, and a digital signal processing device 821 are formed on the same chip. It is to be noted herein that the A/D converter 806 corresponds to the column read circuits 110-1 and 110-2 according to the first embodiment, while the digital signal processing device 821 corresponds to the signal processing circuits 107-1 and 107-2 according to the first embodiment.

The barrier 801 serves as each of a protect and a main switch for the lens 802. The lens 802 focuses an optical image of a subject to be photographed onto the solid-state imaging element 804. The diaphragm 803 adjusts an amount of light having passed through the lens 802.

The solid-state imaging element 804 takes in the subject focused by the lens as an image signal. The sensor 805 includes a focal point detection device (AF sensor) and a color temperature sensor. The A/D converter 806 performs analog-digital conversion on a signal output from the solid-state imaging element 804.

The signal processing device 807 performs signal processing on a digital signal resulting from the AD conversion and on a focal point detection signal. The processing unit 808 performs various correction on image data output from the signal processing device 807 to compress data.

The memory unit 809 temporarily stores the image data. The external I/F circuit 810 is an interface circuit for communicating with the external computer 815.

The timing generation unit 811 outputs various timing signals to the processing unit 808 and the like. The overall control unit 812 controls various arithmetic operations and the entire camera. The recording medium I/F unit 813 is an interface for communicating with the recording medium 814. The recording medium 814 is a detachable recording medium for performing recording or reading, such as a semiconductor memory.

(Operation of Digital Camera): Next, a description will be given of an operation of the digital camera described above during photographing. When the barrier 801 is opened, a main power source is turned ON, and a power source for a control system is turned ON. Then, a power source for imaging system circuits, such as the A/D converter 806, is turned ON.

Then, based on the signal output from the sensor 805 (focal point detection device), the overall control unit 812 arithmetically determines a distance to the subject to be photographed through phase difference detection.

Then, the overall control unit 812 determines whether or not the lens 802 has been driven to achieve a focused state. When determining that the focused state is not achieved, the overall control unit 812 drives the lens 802 to perform autofocus control. Meanwhile, when determining that the focused state is achieved, the overall control unit 812 initiates main exposure.

When the exposure is ended, the image signal output from the solid-state imaging element 804 is subjected to the analog-digital conversion by the A/D converter 806 and written in the memory unit 809 by the overall control unit 812 via the processing unit 808.

Then, the data stored in the memory unit 809 is recorded on the detachable recording medium 814 via the external I/F circuit 810 under the control of the overall control unit 812. The overall control unit 812 may also output the data to the external computer 815 via the external I/F circuit 810.

Note that, in the second embodiment, the signal processing circuits 107-1 and 107-2 used in the photoelectric conversion device 10 perform the extraction of the noise component specific to each channel and the extraction of the horizontal stripe noise specific to each timing. Meanwhile, when a camera system (digital camera) as used in the fifth embodiment is used, it is possible that, e.g., the photoelectric conversion device 10 extracts the noise component specific to each channel and the signal processing device 807 extracts the horizontal stripe noise component specific to each read timing. In this case, a device equivalent to the processing circuit 105-1 according to the second embodiment is mounted in the signal processing device 807.

There is a case where, in the photoelectric conversion device, the signal processing circuits are provided at two or more places, similarly to the signal processing circuits 107-1 and 107-2 according to the first embodiment. Consequently, when the extraction of the horizontal stripe noise specific to each timing is performed, it may conceivably be difficult to obtain the average value of the pixel signals from all the OB pixels to be simultaneously read. In other words, in the configuration of the photoelectric conversion device 10 according to the first embodiment, there are the two signal processing circuits separate from each other, and therefore the pixel signals that can be used to obtain the average value are only the pixel signals from the eight OB pixels.

Meanwhile, by forming the camera system according to the fifth embodiment, the signal processing device 807 averages the pixel signals from all the OB pixels specific to each timing to allow the horizontal stripe noise to be extracted. Thus, according to the fifth embodiment, it is possible to obtain the average value of the pixel signals from the larger number of the OB pixels and therefore more accurately remove the horizontal stripe noise.

Figure 10:
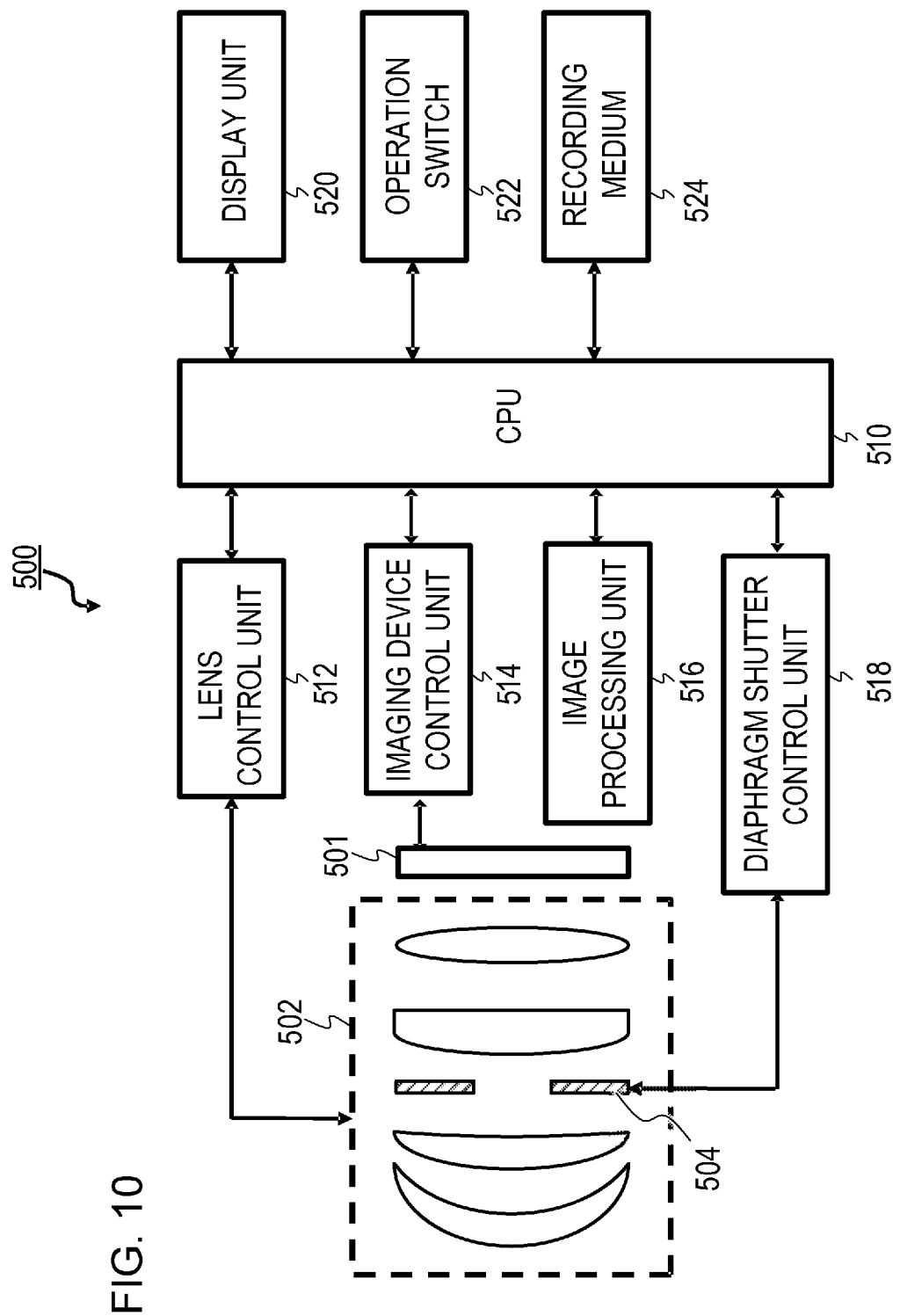
FIG. 10 is a diagram illustrating an example of a configuration of an imaging system according to a sixth embodiment.

<Sixth Embodiment>: Referring to FIG. 10, a description will be given below of an imaging system according to the sixth embodiment. FIG. 10 is a block diagram illustrating a schematic configuration of the imaging system according to the sixth embodiment.

The photoelectric conversion devices 10 (photoelectric conversion devices) described above in the first to fourth embodiments are applicable to various imaging systems. The imaging systems to which the photoelectric conversion devices 10 are applicable are not particularly limited, and examples thereof include various devices such as a digital still camera, a digital camcorder, a monitoring camera, a copier, a fax, a mobile phone, an in-vehicle camera, an observation satellite, and a medical camera. In addition, a camera module including an optical system such as lenses and the photoelectric conversion device is also included in the imaging systems. By way of example, FIG. 10 illustrates a block diagram of the digital still camera as an example of the imaging systems.

An imaging system 500 includes a photoelectric conversion device 501, an imaging optical system 502, a CPU 510, a lens control unit 512, an imaging device control unit 514, an imaging processing unit 516, a diaphragm shutter control unit 518, a display unit 520, operation switches 522, and a recording medium 524 each illustrated in FIG. 10.

The imaging optical system 502 is an optical system for forming an optical image of a subject to be imaged, and includes a lens group, a diaphragm 504, and the like. The diaphragm 504 has not only the function of adjusting an aperture diameter thereof to adjust an amount of light during photographing, but also the function of an exposure second time adjustment shutter during photographing of a still image. The lens group and the diaphragm 504 are held to be forwardly and backwardly movable along an optical axis direction, and operations linked thereto implement a variable magnification function (zoom function) and a focal point adjustment function. The imaging optical system 502 may be integrated with the imaging system or may also be an imaging lens attachable to the imaging system.

In an image space of the imaging optical system 502, the photoelectric conversion device 501 is disposed such that an imaging surface thereof is located in the image space. The photoelectric conversion device 501 is the photoelectric conversion device 10 described in each of the first to fourth embodiments, and is configured to include a CMOS sensor (pixel portion) and a peripheral circuit (peripheral circuit region) therearound. In the photoelectric conversion device 501, a plurality of pixels each having a photoelectric conversion portion are two-dimensionally arranged, and color filters are disposed for these pixels to form a two-dimensional single-plate color sensor. The photoelectric conversion device 501 performs photoelectric conversion of an image of the subject to be imaged which is formed by the imaging optical system 502 and outputs a resulting image as an image signal or a focal point detection signal.

The lens control unit 512 is intended to control forward/backward driving of the lens group of the imaging optical system 502 to perform a variable magnification operation and focal adjustment, and includes a circuit and a processing device which are configured to perform the functions. The diaphragm shutter control unit 518 is intended to change the aperture diameter (vary an aperture value) of the diaphragm 504 to adjust an amount of photographing light, and includes a circuit and a processing device which are configured to perform the functions.

The CPU 510 is a control device in the camera which is responsible for various control of a camera main body and includes an arithmetic unit, a ROM, a RAM, an A/D converter, a D/A converter, a communication interface circuit, and the like. The CPU 510 controls operations of individual components of the camera based on a computer program stored in the ROM or the like to implement a sequence of photographing operations such as AF including detection of a focal state (focal point detection) of the imaging optical system 502, imaging, image processing, and recording. The CPU 510 serves also as a signal processing unit.

The imaging device control unit 514 is intended to control an operation of the photoelectric conversion device 501 and also perform A/D conversion on a signal output from the photoelectric conversion device 501 to transmit a resulting signal to the CPU 510, and includes a circuit and a control device which are configured to implement the functions. The A/D conversion function may also be provided in the photoelectric conversion device 501. The imaging processing unit 516 is intended to perform image processing such as y conversion or color interpolation on the signal resulting from the A/D conversion to generate an image signal, and includes a circuit and a control device which are configured to perform the functions. The display unit 520 is a display device such as a liquid crystal display (LCD) device, and displays information related to a photographing mode of the camera, a preview image before photographing, a confirmation image after the photographing, a focused state when a focal point is detected, and the like. The operation switches 522 include a power source switch, a release (photographing trigger) switch, a zoom operation switch, a photographing mode selection switch, and the like. The recording medium 524 is intended to record a photographed image and the like, and may be either a recording medium embedded in the imaging system or a detachable recording medium such as a memory card.

By thus forming the imaging system 500 to which the photoelectric conversion device 10 (photoelectric conversion device) according to any of the first to fourth embodiments is applied, it is possible to implement a high-performance imaging system.

Figure 11A:
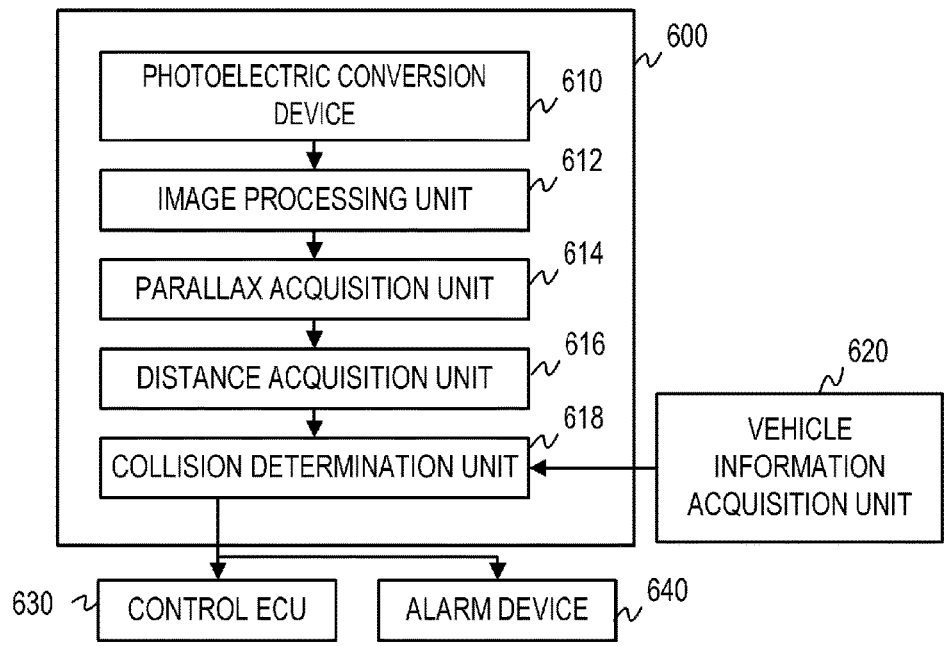
FIG. 11A is a diagram illustrating an example of a configuration of an imaging system according to a seventh embodiment.
Figure 11B:
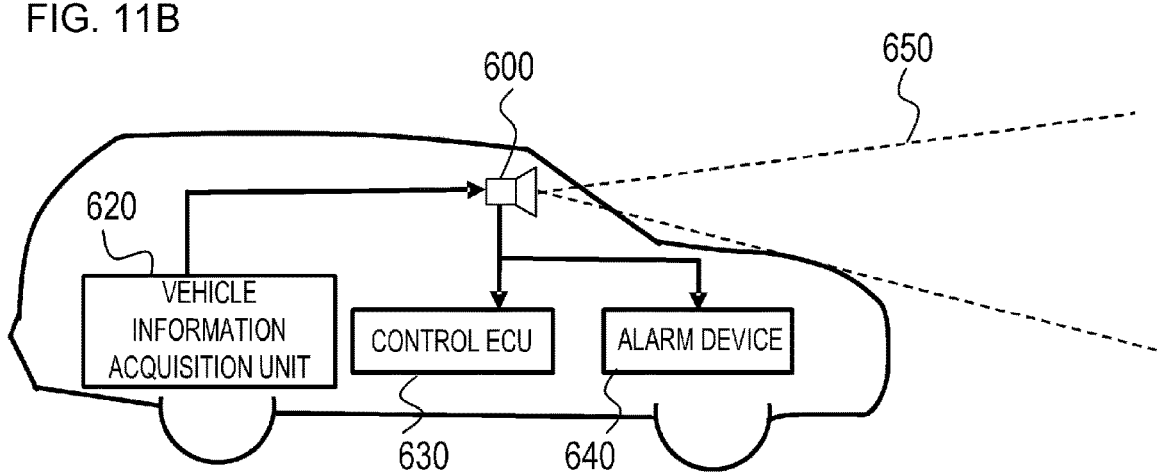
FIG. 11B is a diagram illustrating an example of a configuration of a moving body according to the seventh embodiment.

<Seventh Embodiment>: Referring to FIGS. 11A and 11B, a description will be given of an imaging system and a moving body according to the seventh of the present invention. FIGS. 11A and 11B are diagrams each illustrating a configuration of the imaging system and the moving body according to the seventh embodiment.

FIG. 11A illustrates an example of an imaging system 600 related to an in-vehicle camera. The imaging system 600 includes a photoelectric conversion device 610. The photoelectric conversion device 610 is any one of the imaging devices 10 (photoelectric conversion devices) described above in the first and second embodiments. The imaging system 600 includes an imaging processing unit 612 serving a processing device that performs image processing on a plurality of image data sets acquired by the photoelectric conversion device 610. The imaging system 600 includes a parallax acquisition unit 614 serving as a processing device that performs calculation of a parallax (a phase difference between parallax images) from the plurality of image data sets acquired by the photoelectric conversion device 610. The imaging system 600 also includes a distance acquisition unit 616 serving as a processing device that calculates a distance to a subject to be imaged based on the calculated parallax and a collision determination unit 618 serving as a processing device that determines whether or not there is a possibility of a collision based on the calculated distance. Each of the parallax acquisition unit 614 and the distance acquisition unit 616 mentioned herein is an example of an information acquisition means that acquires information such as distance information sets each representing the distance to the subject. In other words, the distance information sets are information sets related to the parallax, an amount of defocusing, the distance to the subject, and the like. The collision determination unit 618 may also determine the possibility of a collision by using any of the distance information sets. Each of the various processing devices described above may be implemented by hardware designed for a dedicated use or may also be implemented by versatile hardware which performs an arithmetic operation based on a software module. Each of the processing devices may also be implemented by a field programmable gate array (FPGA), an application specific integrated circuit (ASIC), or the like. Alternatively, the processing device may also be implemented by a combination thereof.

The imaging system 600 is connected to a vehicle information acquisition device 620 to be able to acquire vehicle information such as a vehicle speed, a yaw rate, and a steering angle. The imaging system 600 is also connected to a control ECU 630 serving as a control device that outputs a control signal for generating a braking force on a vehicle based on a result of the determination by the collision determination unit 618. In other words, the control ECU 630 is an example of a moving body control means that controls a moving body based on the distance information sets. The imaging system 600 is also connected to an alarm device 640 that generates an alarm to a driver based on the result of the determination by the collision determination unit 618. For example, when the possibility of a collision is high as a result of the determination by the collision determination unit 618, the control ECU 630 performs vehicle control to avoid a collision or reduce damage by braking, easing off an accelerator pedal, or reducing an engine output. The alarm device 640 warns a user through generation of an alarm such as a sound, displaying of alarm information on a screen of a car navigation system or the like, giving of vibration to a seat belt or a steering wheel, or the like.

In the seventh embodiment, the imaging system 600 images a scene around the vehicle, e.g., a scene ahead of or behind the vehicle. FIG. 11B illustrates the imaging system 600 when the scene ahead of the vehicle (imaging range 650) is imaged. The vehicle information acquisition device 620 transmits an instruction to cause the imaging system 600 to operate and perform imaging. By using the photoelectric conversion device 10 (photoelectric conversion device) according to any of the first to fourth embodiments described above as the photoelectric conversion device 610, the imaging system 600 in the seventh embodiment is allowed to have an improved distance measuring accuracy.

The foregoing has described the example in which the imaging system controls a host vehicle so as to prevent a collision with another vehicle. However, the imaging system is also applicable to control of causing the host vehicle to perform automated driving following another vehicle, control of causing the host vehicle to perform automated driving so as not to drift from a lane, or the like. In addition, applications of the imaging system are not limited to a vehicle such as an automobile. For example, the imaging system is also applicable to a moving body (transportation device) such as, e.g., a vessel, an aircraft, an industrial robot, or the like. Moving devices in the moving bodies (transportation devices) are various moving means such as an engine, a motor, wheels, and propellers. Moreover, the applications of the imaging system are not limited to the moving bodies, and the imaging system is also widely applicable to a device using object recognition such as an intelligent transportation system (ITS).

The technique of the present invention can provide a photoelectric conversion device in which noise is more appropriately reduced.

<Other Embodiments>: Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-066197, filed on Apr. 1, 2020 and Japanese Patent Application No. 2021-002274, filed on Jan. 8, 2021, which are hereby incorporated by reference herein in its entirety.

What is claimed is:

1. A photoelectric conversion device comprising:
a plurality of effective pixels and a plurality of light shielded pixels which are arranged respectively in a plurality of rows and a plurality of columns;
a plurality of vertical output lines; and
a signal processing circuit,
wherein a pixel signal is output from a first light shielded pixel which is a first-row light shielded pixel among the plurality of light shielded pixels to a first vertical output line among the plurality of vertical output lines in a first period, and a pixel signal is output from a second light shielded pixel which is a second-row light shielded pixel among the plurality of light shielded pixels to a second vertical output line among the plurality of vertical output lines in a second period, at least a part of the first period and at least a part of the second period are overlapped each other, and the signal processing circuit corrects effective pixel signals output from the effective pixels by using a correction signal obtained by performing filtering processing on the pixel signal from the first light shielded pixel and on the pixel signal from the second light shielded pixel.

2. The photoelectric conversion device according to claim 1, wherein the signal processing circuit performs:

calculation of a first correction signal obtained based on the pixel signal output from the first light shielded pixel and a second correction signal obtained based on the pixel signal output from the second light shielded pixel; and correction of the effective pixel signals by using a correction signal obtained by performing filtering processing on the first correction signal and the second correction signal.

3. The photoelectric conversion device according to claim 1, wherein the signal processing circuit subtracts, from each of the effective pixel signals, a correction signal obtained by performing filtering processing on the pixel signal from the first light shielded pixel and on the pixel signal from the second light shielded pixel, thereby correcting the effective pixel signals.

4. The photoelectric conversion device according to claim 1, wherein the signal processing circuit further corrects the effective pixel signals output to the first vertical output line by using a correction signal obtained by performing filtering processing on pixel signals from a plurality of light shielded pixels.

5. The photoelectric conversion device according to claim 4, wherein each of a plurality of pixel signals output to the first vertical output line is further divided into a plurality of channels and output to the signal processing circuit, and the signal processing circuit corrects the effective pixel signals in one of the channels by using a correction signal obtained by performing filtering processing on pixel signals from a plurality of light shielded pixels in the one channel.

6. The photoelectric conversion device according to claim 5, wherein the signal processing circuit, by using a first synthetic value obtained by weighting a correction signal obtained by performing filtering processing on pixel signals from a plurality of light shielded pixels in a channel and weighting a correction signal previously obtained by performing filtering processing on pixel signals from a plurality of light shielded pixels in the channel, corrects the effective pixel signals in the channel.

7. The photoelectric conversion device according to claim 6, wherein the signal processing circuit, by using a second synthetic value obtained by weighting a third correction signal obtained by subtracting the first synthetic value from a correction signal obtained by performing filtering processing on pixel signals from a plurality of light shielded pixels in the channel and weighting the third correction signal previously obtained, corrects the effective pixel signals in the channel.

8. The photoelectric conversion device according to claim 7, wherein, before calculating the first synthetic value, the signal processing circuit subtracts the second synthetic value previously obtained from a correction signal obtained by performing filtering processing on pixel signals from a plurality of light shielded pixels in the channel.

9. The photoelectric conversion device according to claim 1, further comprising a column read circuit including a memory in which pixel signals are to be stored, wherein the column read circuit reads, from the second vertical output line, pixel signals from second-row pixels in a period during which pixel signals from first-row pixels are read from the first vertical output line, and stores the pixel signals from the second-row pixels in the memory in a period during which the pixel signals from the first-row pixels are stored in the memory.

10. The photoelectric conversion device according to claim 9, wherein the column read circuit performs signal amplification or AD conversion processing on pixel signals from the first-row pixels and the second-row pixels, and then stores, in the memory, the pixel signals that have been subjected to the signal amplification or the AD conversion processing.

11. An imaging system comprising:
the photoelectric conversion device according to claim 1; and
a processing device that processes a signal output from the photoelectric conversion device.

12. A moving body comprising:
the photoelectric conversion device according to claim 1;
a moving device;
a processing device that acquires information from a signal output from the photoelectric conversion device; and
a control device that controls the moving device on a basis of the information.

13. A photoelectric conversion device comprising:
a plurality of effective pixels and a plurality of light shielded pixels which are arranged respectively in a plurality of rows and a plurality of columns;
a plurality of vertical output lines; and
a signal processing circuit,
wherein in a period during which a pixel signal is output from a first light shielded pixel which is a first-row light shielded pixel among the plurality of light shielded pixels to a first vertical output line among the plurality of vertical output lines, a pixel signal is output from a second light shielded pixel which is a second-row light shielded pixel among the plurality of light shielded pixels to a second vertical output line among the plurality of vertical output lines, and
wherein the signal processing circuit corrects effective pixel signals output from the effective pixels by using a correction signal obtained by performing filtering processing on the pixel signal from the first light shielded pixel and on the pixel signal from the second light shielded pixel,
wherein the signal processing circuit, by using a first synthetic value obtained by weighting a correction signal obtained by performing filtering processing on pixel signals from a plurality of light shielded pixels in a channel and weighting a correction signal previously obtained by performing filtering processing on pixel signals from a plurality of light shielded pixels in the channel, corrects the effective pixel signals in the channel.

14. An imaging system comprising:
the photoelectric conversion device according to claim 13; and
a processing device that processes a signal output from the photoelectric conversion device.

15. A moving body comprising:
the photoelectric conversion device according to claim 13;
a moving device;
a processing device that acquires information from a signal output from the photoelectric conversion device; and
a control device that controls the moving device on a basis of the information.

* * * * *